US010506444B2

(12) United States Patent
Srikanteswara et al.

(10) Patent No.: US 10,506,444 B2
(45) Date of Patent: Dec. 10, 2019

(54) SAS PAL GAA CO-CHANNEL INTERFERENCE MITIGATION

(71) Applicant: Intel Corporation, Santa Clara, CA (US)

(72) Inventors: Srikathyayani Srikanteswara, Portland, OR (US); Markus Dominik Mueck, Neubiberg (DE); Ying He, Sydney (AU); Beeshanga Jayawickrama, Sydney (AU); Eryk Dutkiewicz, Sydney (AU); Biljana Badic, Duesseldorf (DE); Zhibin Yu, Unterhaching (DE); Christian Drewes, Germering (DE)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/499,953

(22) Filed: Apr. 28, 2017

(65) Prior Publication Data

US 2017/0318470 A1    Nov. 2, 2017

Related U.S. Application Data

(60) Provisional application No. 62/329,403, filed on Apr. 29, 2016.

(51) Int. Cl.
*H04W 16/14*    (2009.01)
*H04W 52/24*    (2009.01)
(Continued)

(52) U.S. Cl.
CPC ......... *H04W 16/14* (2013.01); *H04W 52/242* (2013.01); *H04W 52/367* (2013.01); *H04W 28/0236* (2013.01); *H04W 72/082* (2013.01)

(58) Field of Classification Search
CPC .............................................. H04W 4/02–043
See application file for complete search history.

(56) References Cited

U.S. PATENT DOCUMENTS

2008/0285477 A1* 11/2008 Kuroda ................ H04L 1/0026
370/252
2013/0259012 A1* 10/2013 Gormley ........... H04W 72/0473
370/336

(Continued)

OTHER PUBLICATIONS

3GPP,"3rd Generation Partnership Project; Technical Specification Group Radio Access Network; Evolved Universal Terrestrial Radio Access (E-UTRA); Further advancements for E-UTRA physical layer aspects (Release 9)", Technical Report, Mar. 2017,TR 36.814 V9.2.0, France.

(Continued)

*Primary Examiner* — San Htun
(74) *Attorney, Agent, or Firm* — Viering, Jentschura & Partner MBB

(57) ABSTRACT

A shared spectrum network device in a higher-tier network may include one or more processors configured to receive information provided from a lower-tier network, estimate, based on the information, interference to the higher-tier network from one or more transmitters of the lower-tier network, compare the estimated interference to a threshold value, and identify a geographic zone in which transmission by one or more transmitters of the lower-tier network is limited based on the comparison.

17 Claims, 15 Drawing Sheets

(51) Int. Cl.
  *H04W 52/36* (2009.01)
  *H04W 28/02* (2009.01)
  *H04W 72/08* (2009.01)

(56) References Cited

U.S. PATENT DOCUMENTS

| | | | | |
|---|---|---|---|---|
| 2015/0245374 A1* | 8/2015 | Mitola, III | ............ | G06Q 30/08 370/329 |
| 2016/0006499 A1* | 1/2016 | Jeong | ................ | H04B 7/18523 455/12.1 |
| 2016/0050690 A1* | 2/2016 | Yun | ................... | H04W 72/1226 370/329 |
| 2016/0057765 A1* | 2/2016 | Jiang | .................... | H04W 16/10 370/329 |
| 2016/0270089 A1* | 9/2016 | Olfat | ................... | H04W 72/082 |
| 2017/0188241 A1* | 6/2017 | Mueck | ................. | H04W 16/14 |
| 2017/0264391 A1* | 9/2017 | Kwon | .................. | H04L 1/0048 |

OTHER PUBLICATIONS

Unknown, "Federal Communications Commission", Federal Register, Jul. 26, 2016, vol. 81, No. 143.

Wheeler et al., "Report and order and second further notice of proposed rulemaking", Federal Communications Commission, Apr. 21, 2015, FCC 15-47, Washington, D.C.

ETSI, "Reconfigurable Radio Systems (RRS); System requirements for operation of Mobile Broadband Systems in the 2 300 MHz-2 400 MHz band under Licensed Shared Access (LSA)", Technical Specification, Oct. 2014, TS 103 154 V1.1.1, France.

* cited by examiner

Existing SAS architecture

PAL GAA interference illustration

SAS PAL GAA CO-CHANNEL INTERFERENCE MITIGATION

CROSS-REFERENCE TO RELATED APPLICATION

This application claims the benefit of U.S. Provisional Application No. 62/329,403, filed Apr. 29, 2016.

TECHNICAL FIELD

Various embodiments generally relate to the field of wireless communications.

BACKGROUND

Recent developments in radio frequency licensing such as spectrum sharing have introduced new possibilities for Mobile Network Operators (MNOs). In particular, proposed spectrum sharing schemes such as Licensed Spectrum Access (LSA, proposed mainly for Europe in the 2.3-2.4 GHz bands) and Spectrum Access System (SAS, proposed mainly in the U.S. for the 3.55-3.7 bands) may open up access to previously restricted wireless frequency bands for mobile communications by allowing MNOs to share certain spectrum bands with "incumbent" users.

Both LSA and SAS propose to use a 'tiered' approach to manage spectrum access where the incumbents occupy the highest 'tier' and thus have the highest priority to utilize the shared spectrum. Accordingly, licensed users may be expected to ensure that a given shared band is not being utilized by an incumbent before accessing the band. While LSA as currently proposed only specifies a two-tiered system of incumbents of licensees, the SAS framework additionally proposes another tier of 'priority' users which may enjoy access priority over lower priority or 'general' users while still yielding access to incumbents. Accordingly, the general users (referred to as General Authorized Access (GAA) users) may only be permitted to access shared spectrum when neither incumbents nor priority users (referred to as Priority Access License (PAL) users) are actively using the shared spectrum. General users may therefore be expected to perform sensing operations in order to determine when use of shared SAS spectrum is permitted, i.e. when no incumbents or priority users are active on the shared spectrum.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
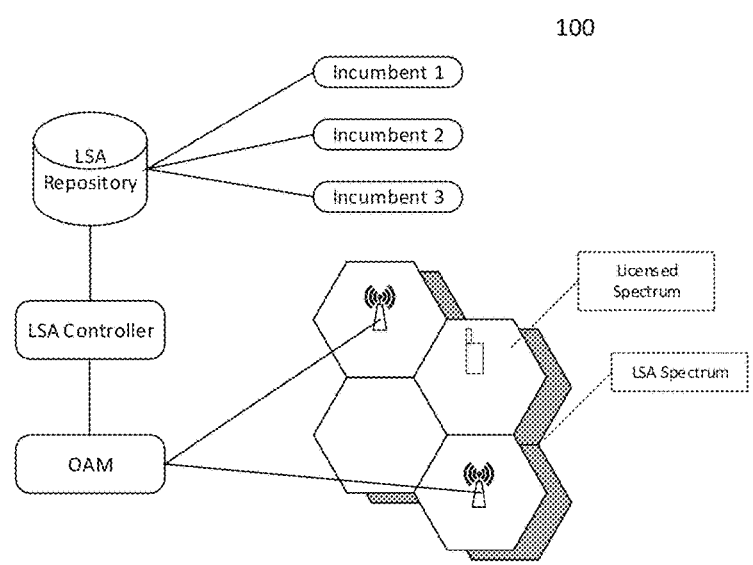
FIG. 1 shows an exemplary Spectrum Access Sharing (SAS) network architecture according to some aspects.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of various aspects of this disclosure. However, it will be apparent to those skilled in the art having the benefit of the present disclosure that various aspects may be practiced in other examples that depart from these specific details. In certain instances, descriptions of well-known devices, circuits, and methods are omitted so as not to obscure the description of the various aspects with unnecessary detail.

In spectrum sharing schemes such as Licensed Spectrum Access (LSA, proposed mainly for Europe in the 2.3-2.4 GHz bands) and Spectrum Access System (SAS, proposed mainly in the U.S. for the 3.55-3.7 bands), Mobile Network Operators (MNOs) may be granted access to previously restricted radio frequency bands. Accordingly, an SAS or LSA "licensee" may license certain targeted frequency bands from "incumbents", and thus may be able to utilize the shared frequency bands.

While the targeted frequency bands for LSA and SAS may already be officially licensed and/or owned by the incumbents (mainly related to government use), the targeted frequency bands may be under-utilized over time and/or space. For example, the incumbents may utilize the targeted frequency bands relatively rarely, and/or may employ the targeted frequency bands only in certain areas. Accordingly, LSA and SAS propose a system in which the targeted frequency bands may be made available to cellular MNOs in scenarios (both geographically and temporally dependent) where the incumbent is not occupying the band. For example, one or more licensed MNOs may be granted access to the targeted frequency bands in scenarios where the incumbent is not actively occupying the targeted frequency bands, and accordingly may utilize the newly available bandwidth for mobile communications.

As indicated above, LSA as specified by the European Telecommunications Standards Institute (ETSI) has identified the 2.3-2.4 GHz frequency band (corresponding to 3GPP LTE Band 40) as a suitable candidate for spectrum sharing, and has additionally been the focus of proposals to also incorporate the 700 MHz and/or 3.6-3.8 GHz bands. Under the proposed LSA framework, a licensee (e.g., an MNO or any other entity that operates a wireless network) may operate a 3GPP LTE network on licensed shared basis, where a licensee may engage in a multi-year sharing contract with an incumbent (e.g., 10 years or more). As incumbents maintain prioritized access of the targeted LSA band over all licensees, any licensee may be required to vacate the targeted LSA band for a given geographic area, given frequency range, and given period of time during which an incumbent is accessing the targeted LSA band.

FIG. 1 shows block diagram 100 illustrating an LSA network architecture. As shown in FIG. 1, LSA spectrum management may rely on a centralized LSA Repository. Incumbents may be required to provide a-priori usage information to the database on the availability of LSA spectrum on a time- and geographic-basis. Depending on the indicated usage information, an LSA controller may employ control mechanisms to grant/deny spectrum access to various licensed incumbents and issue commands to vacate concerned bands. In the current proposed operational approach for LSA, sensing mechanisms may not be required to support the system for identification of incumbent operation. Accordingly, in many cases users may not need to perform sensing to detect incumbent usage; however, this may feasibly be adapted in future proposals.

The LSA repository may be a centralized entity that falls outside of the domain of the MNOs and may interface with the various incumbent users. In the context of LSA, such incumbent users may include wireless cameras (which are allocated spectrum in the targeted LSA band in Europe). Each LSA controller (where each MNO network may include one or more LSA controllers) may thus interface with the LSA repository in order to access the a-priori information provided by the various incumbent users. As shown in FIG. 1, an LSA controller may interface with the Operations, Administration, and Management (OA&M) framework of the MNO in order to provide information on the availability of the shared spectrum to the relevant MNO network components including base stations and end user terminals.

Similarly to LSA, proposed SAS arrangements may allow licensees to operate a 3GPP LTE network on the 3.55-3.7 GHz frequency band on a shared basis with an incumbent. However, as opposed to the two-tier system between incumbent and licensee (tier-2 and tier-2, respectively) in LSA, SAS additionally proposes a third tier (tier-3) composed of General Authorized Access (GAA) users. In this three-tier system, tier-2 users, or "Priority Access License" (PAL) users, may only be allocated a limited portion of the entire SAS band (e.g., the PAL spectrum with to 70 MHz bandwidth) in the absence of an incumbent. The remaining spectrum, in addition to any unused portions of the PAL spectrum, may be allotted to GAA users which may typically employ the available tier-3 spectrum for LTE Licensed Assisted Access (LSA) or WiFi-type systems.

Figure 2:
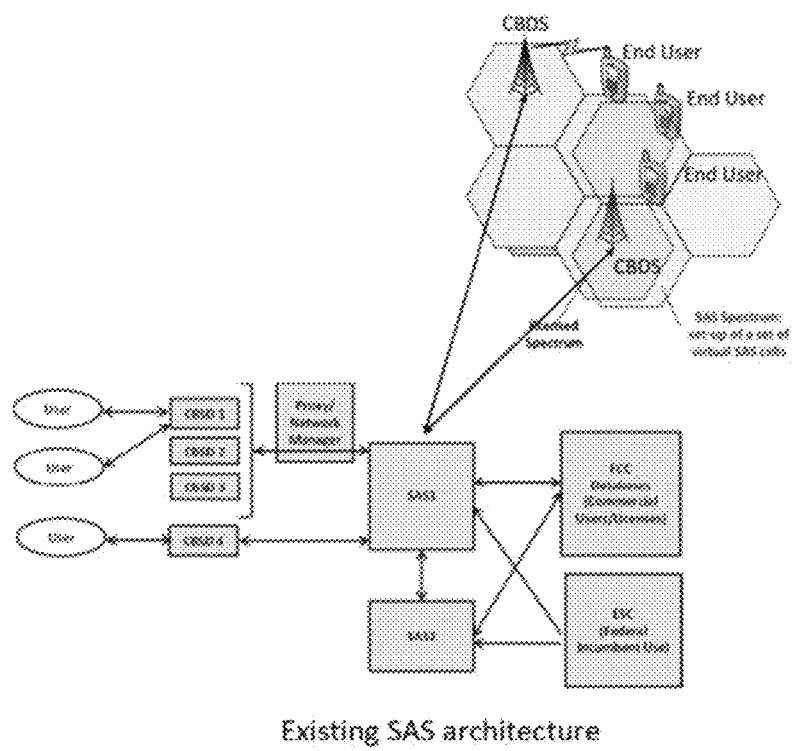
FIG. 2 shows an exemplary Licensed Shared Access (LSA) network architecture according to some aspects.

FIG. 2 shows block diagram 200 illustrating an SAS network architecture. In contrast to LSA, SAS may be designed to ensure coexistence between incumbent users that are not able to provide any a-priori information to a centralized database. As indicated above, SAS may employ a three-tiered system composed of incumbents (tier-1), PAL users (tier-2), and GAA users (tier-3). SAS incumbent users may thus be the highest tier and may generally be protected from interference from the lower-tier PAL and GAA users. Such SAS incumbent users may conventionally be federal or military related, such as Department of Defense (DoD) radars, and may also include other wireless systems such as Fixed Satellite Service (FSS) stations and certain grandfathered terrestrial wireless systems. PAL users (which may include MNOs) may license 10 MHz bands in certain geographic areas (census tracts) and may receive interference protection from GAA users while accepting certain levels of interference from incumbent users. As incumbents are expected to be protected from interference from all lower-tier users, PAL users may be required to vacate the licensed band in certain scenarios where incumbent users wish to utilize the licensed band (where the specifics and frequency of such scenarios may depend on the particulars of each license). As the lowest-tier (tier-3), GAA users may not receive any interference protection (thus accepting interference from both PAL and incumbent users) and may similarly face vacation scenarios in order to protect incumbent users.

As shown in FIG. 2, SAS systems may additionally include an Environmental Sensing Capability (ESC) entity, which may be employed in order to protect incumbent users from interference from PAL and GAA users. Such ESC entities may be composed of a sensor network to detect radio activity by incumbent users, for example, by detecting radio activity by military radar, which may allow an SAS entity to instruct PAL and GAA users to cease transmissions on the shared spectrum and/or re-allocate transmission to a different portion of the shared spectrum in order to protect active incumbents.

Accordingly, SAS networks may include one or more SAS entities (e.g., SAS1 and SAS2 as shown in FIG. 2) which may interact with licensee users (GAA and PAL) in order to facilitate spectrum sharing while guaranteeing interference protection to higher-tiered users from lower-tiered users. Each SAS entity thus interact with the network architectures of the licensee users. As shown in FIG. 2, a SAS entity may interact with a single licensee transmitter (e.g., CBSD4) or with a network of licensee transmitters (e.g., CBSD1-CBSD3) via a proxy/network manager entity, which may act as an interface between a SAS entity and the various network components of a given MNO's network. Each network transmitter, for example, a base station or small cell which are referred to as Citizens Broadband Radio Service Devices (CBSD) in the context of SAS, may thus be able to transmit wireless signals to end users (shown in FIG. 2) according to the shared spectrum access permitted by the corresponding SAS entity. SAS entities may aim to ensure that both the CBSDs (e.g., base stations and small cells) and end users (e.g., mobile terminals) do not cause excessive interference to incumbent users, which the SAS framework may enforce by specifying certain maximum permitted transmit power levels for CBSDs and end user terminals.

Both LSA and SAS may additionally provide Quality of Service (QOS) guarantees to licensees, where a licensee that is granted access to a particular frequency band may be guaranteed a certain QOS level. LSA and SAS also resolve congestion problems through central coordination, such as preventing over-utilization of the targeted frequency bands by incumbents and/or other MNOs at a given time at a central control entity. As previously detailed regarding FIGS. 1 and 2, LSA and SAS systems may employ an LSA controller and SAS entity, respectively, to coordinate access between incumbents and secondary users (e.g., registered licensees). Accordingly, these central control entities may grant secondary users access to LSA and SAS spectrum, which may be on an exclusive basis. Secondary users may therefore enjoy dedicated access to the additional spectrum available through LSA and SAS for a given period of time and in a given geographic area.

As access to LSA and SAS spectrum may be situation-dependent (i.e. time and geographic dependent), shared spectrum may be appropriate for use in a "supplemental" role. For example, given the variable availability of shared spectrum, it may be impractical (albeit possible) in many scenarios to realize a comprehensive wireless network entirely on shared spectrum. However, licensee MNOs may be able to utilize dedicated licensed spectrum (i.e. exclusively licensed by a licensee) in a primary role while allocating shared spectrum for supplemental uplink and/or downlink. Licensee MNOs may thus be able to rely on the constant availability of dedicated licensed spectrum while utilizing shared spectrum to increase bandwidth when the shared spectrum is available.

Accordingly, shared spectrum may be useful in carrier aggregation schemes, which may commonly have a "primary" carrier and one or more "secondary" carriers. Accordingly, licensees may use shared spectrum for secondary carriers to complement the primary carriers composed of dedicated licensed spectrum. Licensees may employ shared spectrum in this manner in either a supplemental downlink (SDL) or supplemental uplink (SUL) role, and may even be able to adjust the relative balance of shared spectrum for SDL and SUL, such as by allocating a greater number of either uplink frames or downlink frames in a Time Division Duplexing (TDD) system or by allocating more of the shared spectrum bandwidth to either uplink or downlink in a Frequency Division Duplexing (FDD) system.

Many of the bands identified by the proposed LSA and SAS systems for European and American systems are employed in other regions as TDD bands for Third Generation Partnership Project (3GPP) networks. Accordingly, many Original Equipment Manufacturers (OEM) may already manufacture handsets configured to utilize the LSA and SAS spectrum for 3GPP TDD networks. Accordingly, it may be relatively straightforward for OEMs to enable manufactured handsets to additionally use the LSA and SAS bands for 3GPP TDD in other regions where the LSA and SAS bands were previously unavailable due to wireless frequency licensing restrictions. Of particular interest may be FDD-TDD carrier aggregation in which a licensee may utilize dedicated licensed spectrum for the FDD carrier and shared licensed spectrum for the TDD carrier. The licensee may thus activate the shared licensed spectrum for the TDD carrier when the licensee is granted access to the shared licensed spectrum in the absence of the incumbent.

As noted above, both SAS and LSA may manage spectrum access according to a 'tiered' access system, where LSA provides for two-tier access system between incumbents and licensees and SAS provides for a three-tier access system between incumbents, PAL ('priority') users, and GAA ('general') users. While all licensed users (non-incumbents) may need to yield shared spectrum access rights to incumbents, general users in SAS networks may additionally need to be aware of priority user activity. Accordingly, general users may need to perform sensing on shared spectrum channels in order to ensure that the shared spectrum is free of both incumbents and priority users before accessing the shared spectrum. While the current LSA proposal does not include such scenarios due to the lack of an additional access tier, such may potentially be included in future proposals. Furthermore, while LSA and SAS are explicitly referenced herein, the following descriptions are demonstrative in nature and may apply in any network scenario where a communication device is detecting radio activity on a plurality of carrier channels (in particular for LTE carrier channels).

Aspects herein relate to protecting the priority access license (PAL) (Tier 2) users from general authorized access (GAA) (Tier 3), which is a mandatory requirement by the FCC. Further, aspects herein may not require complete knowledge of the base station locations, which may be useful. While it can be straightforward to design interference mitigation where each network entity and SAS knows the complete details of all base stations (like location, transmit power, etc.), such interference mitigation may not be viable for the following reasons:

Mobile operators may not wish to share such details, and may decline to use the band if required to share such information.

Any large complex system that relies on realtime instantaneous knowledge of the whole network at each SAS can be inherently un-stable and impractical. A slight delay in transmitting one of the values could result the system breaking down and causing interference.

Aspects herein may relate to:
1. How to best protect PAL users (Tier 2) from transmissions by GAA (Tier 3) users. Aspects may extend the protection/exclusion zone concept to PAL users (typically only used for incumbents (Tier 1) so far).
2. How to provide interference protection from GAA onto PAL users while sharing a minimum of system information. It is a strong requirement from cellular operators to only share a strict minimum of system configuration information with other stakeholders.

Generally, aspects herein may not assume complete knowledge and still achieve interference mitigation, making it useful for 3.5 GHz interference management.

Various aspects may include one or more of the following features:
i) Employ exclusion/protection zones selectively in an intelligent way in order to protect PAL users from GAA transmissions;
ii) Interference protection while sharing a minimum of configuration information is achieved through GAA networks share its distribution of base stations' locations and number of simultaneous transmitters with PAL network (instead of sharing more detailed information such as specific locations, etc.).

Legacy designs may not allow for the usage of exclusion/protection zones for PALs, so a high level of interference from GAA users often needs to be tolerated. This can substantially reduce the system performance for PAL users and thus reduces the value of the resource.

For interference mitigation, the legacy system may require that GAA users exchange detailed configuration information with the SAS entities (for 3.5 GHz US spectrum sharing). This makes the system unattractive for big stakeholders, such as cellular carriers. Aspects herein may resolve this drawback.

Aspects herein may address interference mitigation solutions for spectrum sharing in 3.5 GHz (US Spectrum Access System (SAS)) and/or 2.3-2.4 GHz in Europe (Licensed Shared Access (LSA)).

The FCC released a Report and Order on Apr. 17, 2015, outlining the rules for operating wireless devices in the 3.5 GHz band that spans from 3550-3700 MHz. FCC released this spectrum for sharing with the incumbents. The incumbents (mainly the Department of Defense (DoD)) get priority in that band and it can be used by broadband devices when (and where) incumbents are not using the spectrum. There are two additional tiers of spectrum users in addition to the incumbents, namely the Priority Access (PA) and General Authorized Access (GAA). The Priority Access Licenses (PAL) users get protection from GAA users which is similar to unlicensed spectrum.

As previously introduced above regarding FIG. 1, the FCC also mandates a Spectrum Access System (SAS) that will coordinate the spectrum use between the incumbents, PA and GAA. FCC's Report and Order outlines a sample system with SAS(s) as shown in FIG. 1. However, here are some key points to note about this system:

the FCC does not specify details of how the SAS should be implemented and how it should perform interference mitigation. However, it is an FCC requirement that the SAS perform interference mitigation Any radio that operates in the 3.5 GHz band in the United States is required to follow this three tier system and work with the SAS to perform interference mitigation, which is not optional Spectrum management entities like SAS (3.5 GHz in USA) or LSA (2.3 GHz in EU) are new mandatory entities that are now part of the wireless network.

In Spectrum Access Systems (SAS), the GAA base stations of one SAS network are able to share the same frequency resource with other PAL base stations of another SAS network in the same census tract at the same time. The aggregated interference from GAA base stations to PAL base stations is expected to be below a certain threshold. If the GAA network and the PAL network both know each other's locations, interference can be controlled by channel estimation and power control. However, since it creates an unviable solution as explained previously, aspects herein may use exclusion zone and a PAL and GAA co-channel interference mitigation technique with limited sharing information between two SAS networks.

Accordingly, in some aspects a GAA network can share a mathematical distribution of their base stations' locations and the number of simultaneous transmitters (in the GAA network) with the PAL network. The PAL network can then design exclusion zones to make sure the aggregated interference will be below a certain threshold and send information for the exclusion zones to the GAA network. GAA base stations that are in the census tract but not in the exclusion zones can transmit without causing interference to PAL base stations. Moreover, none of the networks can determine the exact locations of the other network (as the mathematical distribution is used instead). Aspects herein may mitigate both downlink as well as uplink interference.

Aspects may include one or more of the following aspects:

Provides a new way of using exclusion zone to protect PALs

Uses the distribution of GAA transmitters and the number of simultaneous GAA transmitters to obtain the distribution of the aggregated interference Describes a SAS based co-channel interference mitigation procedure between PAL and GAA networks Provides a design for inter-SAS interface to support various aspects Interference Mitigation with SAS In the SAS system, shown in FIG. 2, Tier 3 users (GAA users) are allowed to share the spectrum with Tier 2 users (PAL users) in the same census tract, as long as the aggregated interference from GAA to PAL is below a certain threshold. PAL and GAA users could belong to different operators reporting to different SASs. Therefore, this is an inter-operator interference problem. The challenge of solving this is that operators do not want to share their locations to others. A solution may therefore: 1) make sure the interference is below the threshold, and 2) protect the locations of the base stations.

In some aspects, exclusion zones can be leveraged to protect PAL from interference from GAA base stations. The idea of exclusion zones has been used in Licensed Shared Access (LSA) and SAS system to protect the incumbents from the interference from licensees (for example, a fixed geo-location area around incumbents). Aspects herein may include dynamic exclusion zones around PAL that can control the interference and also protect the locations of base stations.

Moreover, the communication overhead between two operators (SASs) can also be important for the design of SAS. Too much communication overhead will consume time and power of the system. For example, the measure and feedback technique can create such problem. Various aspects herein also may consider communication overhead. Two-way communication will happen only once per round and very few numbers or parameters may be passed through the inter SAS interface.

The FCC (at 15-47 section 96.41 (f) of the Report and Order of Apr. 17, 2015) specifies a constraint regarding the acceptable levels of GAA interference onto PAL users as follows: "Priority Access Licensees must accept adjacent channel and in-band blocking interference (emissions from other authorized Priority Access or GAA CBSDs transmitting between 3550 and 3700 MHz) up to a power spectral density level not to exceed −40 dBm in any direction with greater than 99% probability when integrated over a 10 megahertz reference bandwidth, with the measurement antenna placed at a height of 1.5 meters above ground level, unless the affected Priority Access Licensees agree to an alternative limit and communicates that to the SAS."

This constraint can be formulated as $$P[I_j < I_0] > 0.99 \qquad (1)$$

where $I_j$ is the aggregated interference at the PAL base station j and $I_0 = -40$ dBm.

Figure 3:
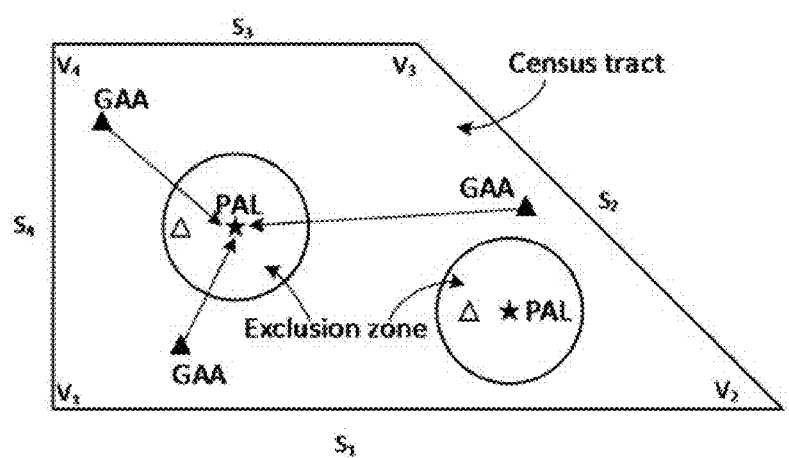
FIG. 3 shows an illustrative example of interference between users of different tiers in a shared spectrum network according to some aspects.

The census tracts and exclusion zones can be modeled as finite, closed areas, such as polygon or circle shapes as illustrated in FIG. 3. GAA base stations' locations and transmit power follow a mathematical distribution y, where the total number of simultaneous GAA transmitters is $N_{TX}$.

Figure 4:
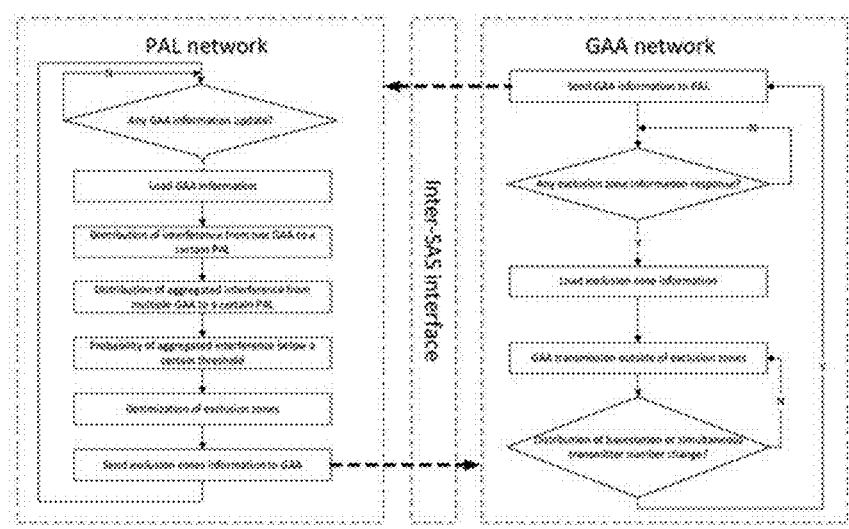
FIG. 4 shows an exemplary process of managing interference in a shared spectrum network according to some aspects.

Procedure in PAL Network ("PAL Network" Flow of FIG. 4)

The procedure in the PAL network according to various aspects can be summarized as:

Stage 0: PAL network listens to inter-SAS interface for GAA network information update, if any go to Stage 1;

Stage 1: Distribution of the interference from one GAA base station

For the PAL base station j in the exclusion zone k, the distribution of interference from one GAA base station can be derived analytically or calculated numerically according to distribution y, such as probability density function (PDF) and cumulative density function (CDF) of interference;

Stage 2: Distribution of the aggregated interference from multiple GAA base station Then the distribution of interference from $N_{TX}$ GAA base stations to PAL base station j in the exclusion zone k can be derived or calculated using convolution, moment generating function or characteristic function. One exclusion zone can cover more than one PAL base station;

Stage 3: Probability of aggregated interference below a certain threshold

PAL network can derive or calculate $P[I_j<I_0]$ with given GAA network information (distribution y, simultaneous transmitter number is $N_{TX}$ and PAL network information (exclusion zone location and area). PAL network cannot derive or calculate the exact location of GAA base stations given the GAA network information. PAL exclusion zones need to protect the PAL base stations location, so GAA network cannot derive or calculate locations of PAL base stations according to the exclusion zones;

Stage 4: Optimization of exclusion zone

The exclusion zone location and area can be optimized for various objectives, such as minimum exclusion zone area or maximum GAA capacity with the constraint above. PAL network can figure out the optimum exclusion zone allocation and send this information to GAA network;

Stage 5: send exclusion zone information to GAA network through inter-SAS interface, go back to Element 0.

Procedure in GAA Network ("GAA Network" Flow of FIG. 4)

The procedure in the GAA network can be summarized as:

Stage 0: GAA collects following information for both base station/mobile transmitters and users:
a) location distribution,
b) the transmitter power UE location can be obtained by positioning techniques like OTDOA or estimated by power attenuation from base station to users. The transmit power of user is collected by a specified closed transmit power control loop.

For both information in a) and b) further tuning can be done by creating the distribution of the power among base station or users, that is the distribution \gamma defined in the inter-SAS interface, i.e. GAA unifies together base stations and/or users with the similar power level. This information, shared with PAL in the next element enables PAL to optimize its exclusions zones.

Stage 1: send GAA information to PAL network through inter-SAS interface, go to Stage 2;

Stage 2: listen to inter-SAS interface, wait for the PAL exclusion zone information response, if any go to Stage 3;

Stage 3: GAA transmission following the exclusion zone information, if any changes of distribution of base stations' location or simultaneous transmitter number, go to Stage 1.

Design of Inter-SAS Interface

The inter-SAS interface needs to provide interface support for this technique as shown below in Table 1:

| Parameter | Direction |
|---|---|
| GAA distribution γ | GAA to PAL |
| Simultaneous transmitter number $N_{TX}$ | GAA to PAL |
| Exclusion zone information | PAL to GAA |

Implementation of Various Aspects

The following details exemplary implementations of various aspects. Other possible implementations that follow the same technique are also considered within the scope of this disclosure.

In the PAL network procedure, from Stages 1 to 4, one implementation may be as follows Stage 1: PAL network derives or calculates the PDF of the distance of one GAA to a certain PAL;

Stage 2: PAL network derives or calculates the PDF of the interference of one GAA to a certain PAL. If the inverse function of the interference function of distance exists, the PAL network can use transformation function to figure out the PDF of interference of one GAA to a certain PAL, otherwise, the PAL network can use numerical approximation.

Stage 3: Aspects may use inverse discrete Fourier transform (IDFT) of PDF of the interference of one GAA to a certain PAL to obtain the characteristic function of interference of one GAA to a certain PAL. The PAL network can then product the result to the power of transmitter number to obtain the characteristic function of interference of multiple GAA to a certain PAL. The PAL network can then use discrete Fourier transform (DFT) to obtain the PDF of interference of multiple GAA to a certain PAL. This element can also be implemented with convolution of PDF of the interference of one GAA to a certain PAL.

Stage 4: Integrate PDF the interference of one GAA to a certain PAL in the possible region to get the CDF of the interference of one GAA to a certain PAL.

Stage 5: Get the probability from CDF of Multiple GAA interference to a PAL according to the threshold.

EXAMPLES

The following description shows two examples of implementations of various aspects. However, the ideas and techniques described herein may be applicable to additional or alternative cases than those presented below.

In a first example, a PAL network can calculate the aggregated interference to the PAL network from GAAs given a fixed PAL exclusion zone size.

The first example relies on several assumptions:
GAA transmission follow the distribution and simultaneous transmitters' number information shared with PAL network
Locations of GAA base stations are independent
Transmission from GAA base stations are independent
No incumbent users are transmitting when channels are assigned to PAL
Census tract is a closed, finite area
GAA base stations have same maximum transmit power in this particular example.

In real mobile networks, the transmit power may vary. However, by adding the distribution of the transmit power, the same technique can still be used to calculate the distribution of aggregated interference.

The first example can use several parameter settings. As shown in FIG. 3, a census tract can be provided with $\{S_1, \ldots, S_4\}$ as sides and $\{V_1, \ldots, V_4\}$ as vertices, where $$\{S_1 = 1000 \text{ m}, S_2 = 707.11 \text{ m}, S_3 = S_4 = 500 \text{ m}\} \quad (2)$$

and $$\left\{V_1 = \frac{\pi}{2}, V_2 = \frac{\pi}{4}, V_3 = \frac{3\pi}{4}, V_4 = \pi/2\right\} \quad (3)$$

Two PAL base stations and $N_{TX}$ GAA base stations are inside of the census tract.

The exclusion zones can be set around the PAL base stations as circles, where the radius is 100 m.

It can be assumed that the locations of GAA base stations follow a uniform distribution, and that all GAA base stations use the same transmit power $P_t$=24 dBm.

Only path loss is considered in this example. The path loss model defined in the LTE specification ($3^{rd}$ Generation Partnership Project (3GPP) Technical Specification (TS) 36.814) can also be used, and is defined as $$L_{ij}(\text{dB}) = 43.3 \log_{10} d + 11.5 + 20 \log_{10} f_c \quad (4)$$

with central frequency $f_c$=3.6 GHz (between 3.55 and 3.7 GHz, although central frequency in an actual mobile network may be different).

The first example can focus on the PAL network at coordinated {250m, 250m}. Corresponding to stage 1 of FIG. 5, the PDF of the distance from one GAA base station to the PAL $f_R(r)$ is shown in FIG. 6.

According to the path loss model, the PAL can derive the PDF of interference from a single GAA base station to the PAL network $f_Y(y)$ from $f_R(r)$ using the transformation function $$f_Y(y) = f_R(r(y))\left|\frac{dr}{dy}\right| = f_R((My)^\lambda)|\lambda M(My)^{\lambda-1}| \quad (5)$$

where $$10 * \log_{10} y + 30 = P_t(dBm) - L_{ij}(\text{dB}) \quad (6)$$
$$L_{ij}(\text{dB}) = 43.3 \log_{10} r + 11.5 + 20\log_{10} f_c$$

Using this path loss model, the receiving interference can be written as $$y(r) = P_t K\left(\frac{d_0}{r}\right)^\beta \quad (7)$$

where $\beta$, K, and $d_0$ can be derived from the path loss model, such as the LTE path loss model as in the current case. Although path loss in the general case can be different, the same technique can be equivalently employed. The inverse function of the distance of the receiving interference is thus $$r(y) = (My)^\lambda \text{ where } M = \frac{d_0^{-B}}{KP_t} = 0.0217, \lambda = -\frac{1}{\beta} = -0.2309. \quad (8)$$

Figure 7:
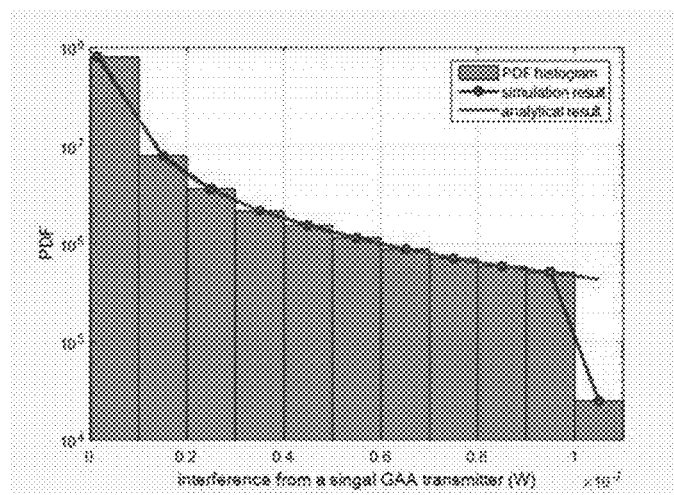
FIG. 7 shows an exemplary statistical distribution of interference from a single lower-tier network transmitter to a higher-tier network according to some aspects.

The resulting PDF of interference from a single GAA base station to the PAL is shown in FIG. 7.

The characteristic function can then be used to obtain the PDF of the aggregated interference from $N_{TX}$ GAA transmitters to a PAL.

$$f_z(z) = F[(F^{-1}[f_Y(y)])^{N_{TX}}] \quad (9)$$

where $F[\cdot]$ and $F^{-1}[\cdot]$ respectively denote the Fourier transform and inverse Fourier transform. The discrete Fourier transform (DFT) and inverse discrete Fourier transform (IDFT) can also be used to simply the computation.

Figure 8:
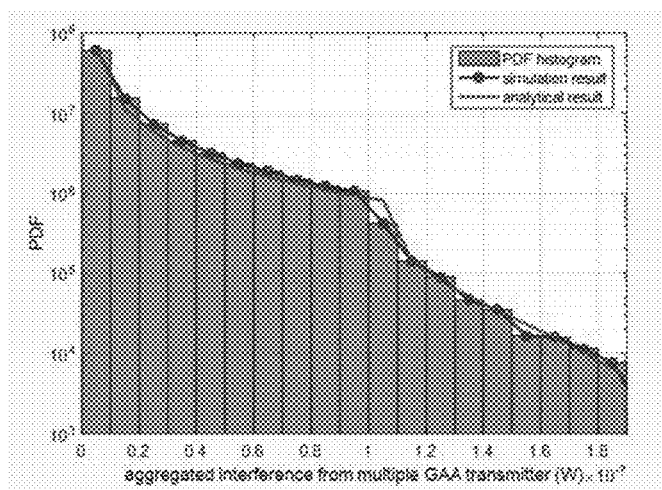
FIG. 8 shows an exemplary statistical distribution of interference from multiple lower-tier network transmitters to a higher-tier network according to some aspects.

The resulting PDF of the aggregated interference from $N_{TX}$ GAA transmitters to a PAL is shown in FIG. 8.

The PDF of the aggregated interference $f_z(z)$ can then be integrated to get the CDF of the aggregated interference as $$F_z(I_0) = \int_0^{I_0} f_z(z) dz \quad (10)$$

where $I_0$=−40 dBm.

Figure 9:
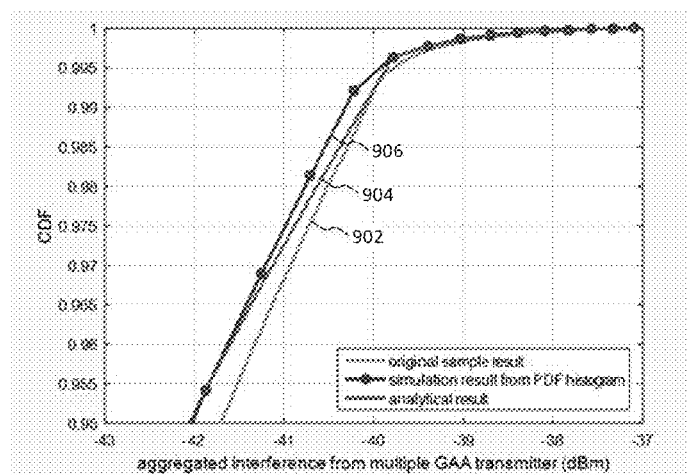
FIG. 9 shows an exemplary cumulative statistical distribution of interference from multiple lower-tier network transmitters to a higher-tier network according to some aspects.

The resulting CDF of the aggregated interference is shown in FIG. 9. Curve 902 shows the CDF simulation result from the original samples, curve 904 shows the analytical results, and curve 906 shows the CDF simulation results from the integral of PDF histogram data from FIG. 8. The gap (approximately 0.2 dBm at 0.99 CDF) between the simulation results from the original sample (curve 902) and the simulation results from the PDF histogram data (curve 906) arises due to the plotting estimation software and not from the technique detailed herein. FIG. 9 also shows that the analytical result (curve 904) is a close approximation to the simulation results from the PDF histogram (curve 906).

In the second example, a PAL network may optimize the PAL exclusion zone size given a GAA distribution y and the number of simultaneous GAA transmitters $N_{TX}$. In particular, if the number of GAA transmitters $N_{TX}$ changes, the PAL exclusion zone size should change accordingly. The second example therefore shows how the PAL network can determine an optimum PAL exclusion zone radius based on different numbers of GAA transmitters $N_{TX}$.

Figure 5:
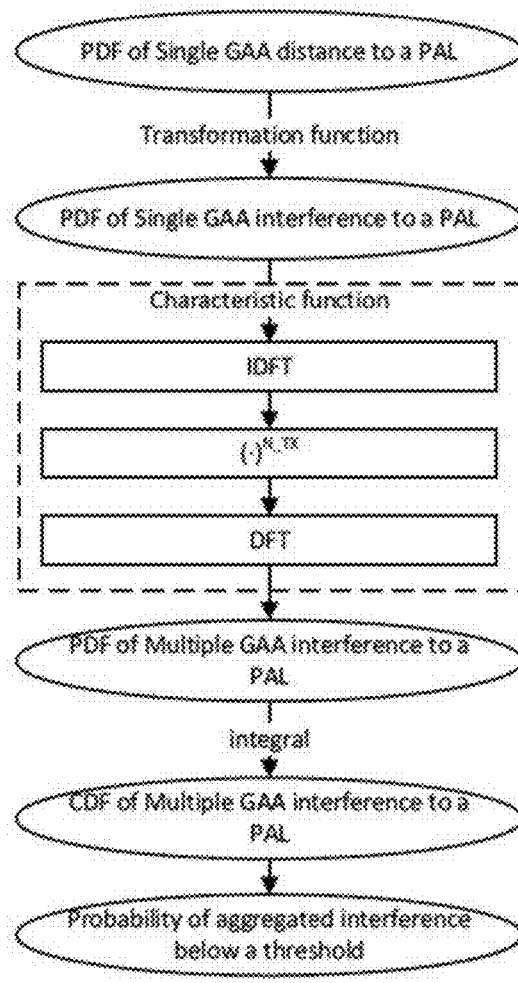
FIG. 5 shows an exemplary process of managing interference at a higher-tier network of a shared spectrum network according to some aspects.
Figure 6:
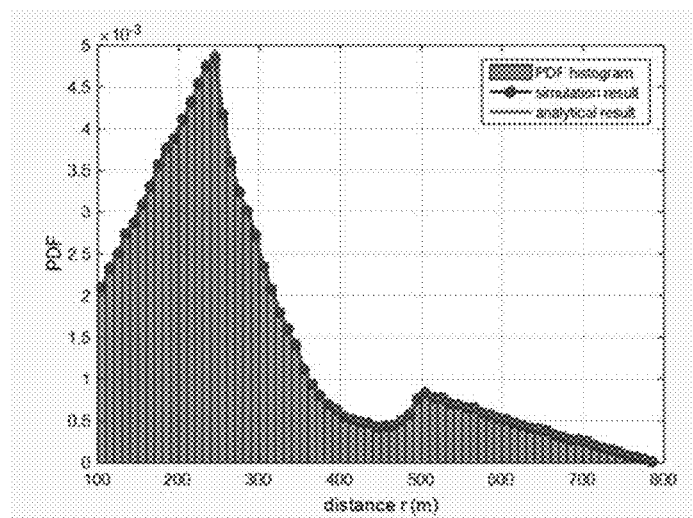
FIG. 6 shows an exemplary statistical distribution of lower-tier network transmitter location relative to a higher-tier network according to some aspects.

The number of GAA transmitters $N_{TX}$ may be within the range $2 \le N_{TX} \le 12$, where the GAA is expected to report the GAA transmit number $N_{TX}$ to the PAL network so the PAL network can calculate the optimum PAL exclusion zone radius by using the described interference mitigation technique (for example, as shown in FIGS. 4 and 5).

Figure 10:
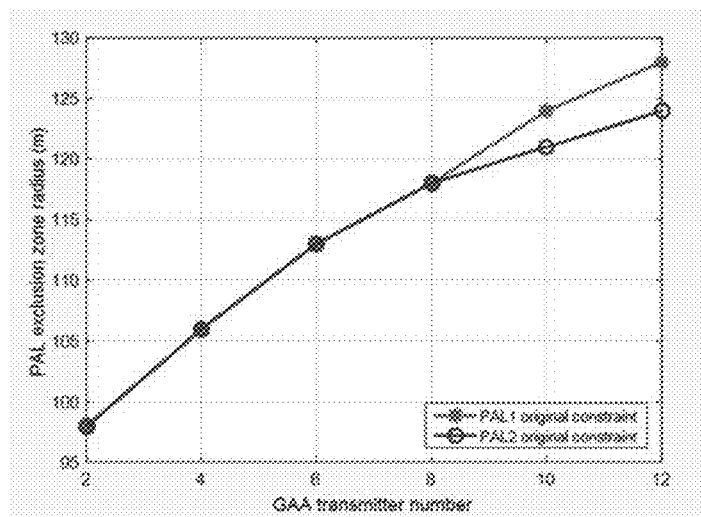
FIG. 10 shows an illustrative example of exclusion zone radii for managing interference in a shared spectrum network according to some aspects.

The results in FIG. 10 show that with the increase in the number of GAA transmitters $N_{TX}$, the PAL exclusion zone size should increase as well. Moreover, with a small number of GAA transmitters $N_{TX}$, (e.g., $N_{TX}$=8 in this scenario), the exclusion zone size of PAL 1 and PAL 2 is the same. However, with a larger number of GAA transmitters $N_{TX}$ (e.g., $N_{TX}$>8), PAL 1 should have a larger exclusion zone than PAL 2. As the location of PAL 1 is more central, there is a higher probability of PAL 1 suffering from interference. When the number of GAA transmitters $N_{TX}$ increases, this effect is more prominent, hence calling for a larger radius than PAL 2.

The demonstrative examples described herein may be applied in any type of shared spectrum network, including but not limited to SAS and LSA networks. For example, an incumbent network (tier-1) in an LSA network may assume the role and functionality of the PAL network as described above while a licensee network (tier-2) in the LSA network may assume the role and functionality of the GAA network as described above. Accordingly, the licensee network (e.g., at a base station, CBSD, or CN device) may obtain a statistical distribution and number of transmitters and provide this information to the incumbent network. The incumbent network may then numerically evaluate the statistical distribution and number of transmitters to estimate the interference from a single transmitter of the licensee network (e.g., as a PDF) and estimate the aggregate interference from multiple transmitters of the incumbent network. The incumbent network may then determine an exclusion zone based on the aggregate interference and indicate the exclusion zone to the licensee network. The licensee network may then restrict (e.g., fully or partially) its transmitters from transmitting in the indicated exclusion zone. The demonstrative examples described herein may be applied in the same manner to protect a SAS incumbent from a SAS licensee (e.g., GAA or PAL).

Furthermore, while LSA as currently specified by ETSI targets a two-tiered system of incumbents and licensees, these demonstrative examples may also be applied to LSA systems with three tiers in the event that the LSA standard (or any related standard) is expanded to include three tiers. For example, the same approach could be used in a future LSA evolution where the current "LSA spectrum licensee" is a tier-2 user to be protected and a new "LSA license-exempt or unlicensed user" is admitted into LSA (which currently does not exist), where the LSA license-exempt or unlicensed user could take the role of the tier-3 network as described herein with the obligation to protect tier-2 users based on the proposed schemes.

In various aspects, the demonstrative examples described herein can be applied to any type of geographic zone in which transmission by transmitters in a lower-tier network (e.g., a GAA network) are limited, which can assist in limiting harmful interference to transmitters of a higher-tier network (e.g., a PAL network). The geographic zone can be any of an exclusion zone, a restriction zone, or a protection zone. Exclusion zones (e.g., as generally defined for LSA) are geographic areas in which a lower-tier network is not allowed to have active radio transmitters, such as for an LSA licensee to protect an LSA incumbent from interference. Restriction zones (e.g., as generally defined for LSA) are geographic areas in which lower-tier networks are allowed to operate radio transmitters but only under certain restrictive conditions (e.g., maximum Equivalent Isotropically Radiated Power (EIRP) limits and/or constraints on antenna parameters), such as for an LSA licensee to protect an LSA incumbent. Protection zones (e.g., as generally defined for LSA) are geographic areas in which receivers of a higher-tier network will not be subject to harmful interference caused by transmission by lower-tier networks, such as where LSA incumbent receivers will not be subject to harmful interference caused by LSA licensees. Protection zones can be defined using specific measurement quantities and thresholds, such as a mean field strength that does not exceed a defined value in dBµV/m/MHz at a defined receiver antenna height above ground level. Exclusion zones, restriction zones, and protection zones may be defined for a defined frequency range and time period. As generally defined for SAS, the term "exclusion zone" is given meaning as "major receive sites would be protected via geographic exclusion zones regulated through licensed wireless service areas".

In some aspects, the exemplary implementations described herein can be applied to assist in transitions between deployment stages of shared spectrum networks. Without loss of generality, an initial phase of SAS deployment may have only a small number of users (e.g., licensees), where the number may be sufficiently small that there is at most one user per GAA channel. Since the SAS spectrum will accordingly not be broadly used and may only be limited to one user per GAA channel, there may not be an immediate need to consider contention between multiple users. Accordingly, a non-contention-based access system may be employed. For example, an initial SAS deployment with only one user allocated to each GAA channel may permit for each user to deploy an LTE system on their GAA channel. Even though LTE is non-contention-based, the lack of other competing users may enable users to use LTE on these GAA channels.

During a later deployment stage when more users are expected to be supported, this initial non-contention-based deployment may be transitioned to a contention-based system that supports multiple users per GAA channel, such as with MulteFire or another contention-based access system. For a full MulteFire (or other contention-based access system) deployment on each GAA channel, users would be able to take turns accessing the GAA channel per the constraints of the contention rules. However, the transition from LTE to MulteFire may be problematic, as the LTE users would not be compatible with the MulteFire users due to the lack of contention-based protocols in LTE. Accordingly, the demonstrative examples detailed herein may be applied to such a scenario, where the LTE users assume the role of the higher-tier network (e.g., PAL networks in the examples described above) and the MulteFire users assume the role of the lower-tier network (e.g., the GAA networks in the examples described above).

The implementations described herein may therefore be used to protect the LTE users from the MulteFire users. Accordingly, the MulteFire networks (e.g., at a base station, CBSD, or CN device) may obtain a statistical distribution and number of transmitters and provide this information to the LTE network. The LTE network may then numerically evaluate the statistical distribution and number of transmitters to estimate the interference from a single transmitter of the MulteFire network (e.g., as a PDF) and estimate the aggregate interference from multiple transmitters of the MulteFire network. The LTE network may then determine an exclusion zone based on the aggregate interference and indicate the exclusion zone to the MulteFire network. The MulteFire network may then restrict (e.g., fully or partially) its transmitters from transmitting in the indicated exclusion zone.

Furthermore, the demonstrative examples described herein may also be employed in other types of shared networks, such as, without loss of generality, narrowband Internet of Things (IoT) networks and Device-to-Device (D2D) networks. When a prioritized hierarchy is present, any higher-tier network or device may assume the role and functionality of the PAL network as described above (e.g., to calculate an exclusion zone based on statistical distribution and transmitter number information provided by a lower-tier network, and to indicate the exclusion zone to the lower-tier network). Any lower-tier network or device may then assume the counterpart role and functionality of the GAA network as described above (e.g., to obtain and provide statistical distribution and transmitter number information to the higher-tier network, receive an exclusion zone in response, and to restrict transmission by its transmitters in the exclusion zone).

The demonstrative examples described above can therefore be applied to any hierarchy of higher-tier and lower-tier networks (where the total number of tiered networks in the hierarchy is scalable to any positive integer greater than one). The terms "higher-tier network" and "lower-tier network" can thus broadly refer to any case where lower-tier network has some an obligation to provide some level of protection to the higher-tier network. This protection can include any one or more of i) interference protection (e.g., as applied in SAS schemes), ii) protection of special services, such as emergency services (e.g., the lower-tier network is switched off or output power is reduced or similar if the priority needs to be given to other services), iii) protection of user classes (e.g., data traffic should protect voice traffic), or any similar type of protection.

Additionally, while the above demonstrative examples consider the interference from one lower-tier network to one higher-tier network, further aspects in which a higher-tier network considers interference by multiple lower-tier networks are also within the scope of this disclosure. For example, the higher-tier network may receive statistical distribution and transmitter number information from multiple lower-tier networks, and calculate separate exclusion zones for each of the lower-tier networks. The higher-tier network may calculate the exclusion zones together (e.g., while simultaneously considering the interference from multiple of the lower-tier networks) or independently (e.g., while considering the interference from one lower-tier network in isolation). The higher-tier network may then provide the exclusion zones to their respective lower-tier networks, which may then restrict transmission by their transmitters accordingly.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

Figure 11:
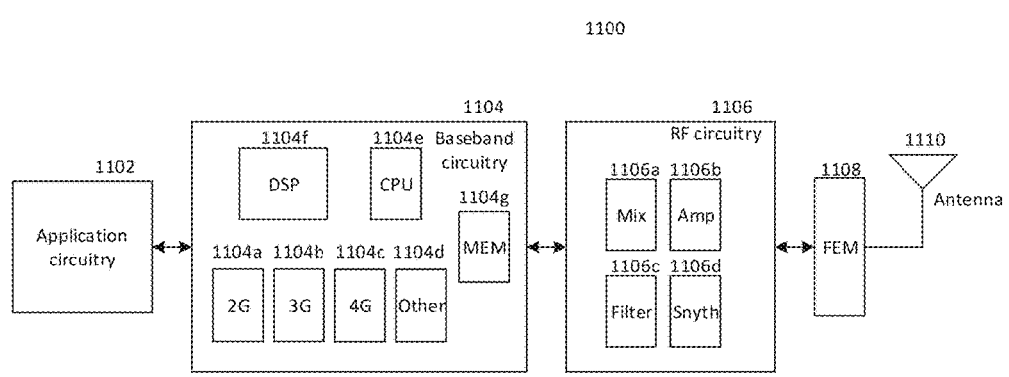
FIG. 11 shows an exemplary internal configuration of an electronic device according to some aspects.

Aspects described herein may be implemented into a system using any suitably configured hardware and/or software. FIG. 11 illustrates, for one aspect, example components of an electronic device 1100. In aspects, the electronic device 1100 may be, implement, be incorporated into, or otherwise be a part of a user equipment (UE), an evolved NodeB (eNB), and/or some network entity of a PAL and/or GAA network. In some aspects, the electronic device 1100 may include application circuitry 1102, baseband circuitry 1104, Radio Frequency (RF) circuitry 1106, front-end module (FEM) circuitry 1108 and one or more antennas 1110, coupled together at least as shown.

The application circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1104 may include circuitry such as, but not limited to, one or more single-core or multi-core processors. The baseband circuitry 1104 may include one or more baseband processors and/or control logic to process baseband signals received from a receive signal path of the RF circuitry 1106 and to generate baseband signals for a transmit signal path of the RF circuitry 1106. Baseband processing circuitry 1104 may interface with the application circuitry 1102 for generation and processing of the baseband signals and for controlling operations of the RF circuitry 1106. For example, in some aspects, the baseband circuitry 1104 may include a second generation (2G) baseband processor 1104a, third generation (3G) baseband processor 1104b, fourth generation (4G) baseband processor 1104c, and/or other baseband processor(s) 1104d for other existing generations, generations in development or to be developed in the future (e.g., fifth generation (5G), 6G, etc.). The baseband circuitry 1104 (e.g., one or more of baseband processors 1104a-d) may handle various radio control functions that enable communication with one or more radio networks via the RF circuitry 1106. The radio control functions may include, but are not limited to, signal modulation/demodulation, encoding/decoding, radio frequency shifting, etc. In some aspects, modulation/demodulation circuitry of the baseband circuitry 1104 may include Fast-Fourier Transform (FFT), precoding, and/or constellation mapping/demapping functionality. In some aspects, encoding/decoding circuitry of the baseband circuitry 1104 may include convolution, tail-biting convolution, turbo, Viterbi, and/or Low Density Parity Check (LDPC) encoder/decoder functionality. Aspects of modulation/demodulation and encoder/decoder functionality are not limited to these examples and may include other suitable functionality in other aspects.

In some aspects, the baseband circuitry 1104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1104e of the baseband circuitry 1104 may be configured to run elements of the protocol stack for signaling of the PHY, MAC, RLC, PDCP and/or RRC layers. In some aspects, the baseband circuitry may include one or more audio digital signal processor(s) (DSP) 1104f. The audio DSP(s) 1104f may be include elements for compression/decompression and echo cancellation and may include other suitable processing elements in other aspects.

The baseband circuitry 1104 may further include memory/storage 1104g. The memory/storage 1104g may be used to load and store data and/or instructions for operations performed by the processors of the baseband circuitry 1104. Memory/storage for one aspect may include any combination of suitable volatile memory and/or non-volatile memory. The memory/storage 1104g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 1104g may be shared among the various processors or dedicated to particular processors.

Components of the baseband circuitry may be suitably combined in a single chip, a single chipset, or disposed on a same circuit board in some aspects. In some aspects, some or all of the constituent components of the baseband circuitry 1104 and the application circuitry 1102 may be implemented together such as, for example, on a system on a chip (SOC).

In some aspects, the baseband circuitry 1104 may provide for communication compatible with one or more radio technologies. For example, in some aspects, the baseband circuitry 1104 may support communication with an evolved universal terrestrial radio access network (EUTRAN) and/or other wireless metropolitan area networks (WMAN), a wireless local area network (WLAN), a wireless personal area network (WPAN). Aspects in which the baseband circuitry 1104 is configured to support radio communications of more than one wireless protocol may be referred to as multi-mode baseband circuitry.

RF circuitry 1106 may enable communication with wireless networks using modulated electromagnetic radiation through a non-solid medium. In various aspects, the RF circuitry 1106 may include switches, filters, amplifiers, etc. to facilitate the communication with the wireless network. RF circuitry 1106 may include a receive signal path which may include circuitry to down-convert RF signals received from the FEM circuitry 1108 and provide baseband signals to the baseband circuitry 1104. RF circuitry 1106 may also include a transmit signal path which may include circuitry to up-convert baseband signals provided by the baseband circuitry 1104 and provide RF output signals to the FEM circuitry 1108 for transmission.

In some aspects, the RF circuitry 1106 may include a receive signal path and a transmit signal path. The receive signal path of the RF circuitry 1106 may include mixer circuitry 1106a, amplifier circuitry 1106b and filter circuitry 1106c. The transmit signal path of the RF circuitry 1106 may include filter circuitry 1106c and mixer circuitry 1106a. RF circuitry 1106 may also include synthesizer circuitry 1106d for synthesizing a frequency for use by the mixer circuitry 1106a of the receive signal path and the transmit signal path. In some aspects, the mixer circuitry 1106a of the receive signal path may be configured to down-convert RF signals received from the FEM circuitry 1108 based on the synthesized frequency provided by synthesizer circuitry 1106d. The amplifier circuitry 1106b may be configured to amplify the down-converted signals and the filter circuitry 1106c may be a low-pass filter (LPF) or band-pass filter (BPF) configured to remove unwanted signals from the down-converted signals to generate output baseband signals. Output baseband signals may be provided to the baseband circuitry 1104 for further processing. In some aspects, the output baseband signals may be zero-frequency baseband signals, although this is not a requirement. In some aspects, mixer circuitry 1106a of the receive signal path may comprise passive mixers, although the scope of the aspects is not limited in this respect.

In some aspects, the mixer circuitry 1106a of the transmit signal path may be configured to up-convert input baseband signals based on the synthesized frequency provided by the synthesizer circuitry 1106d to generate RF output signals for the FEM circuitry 1108. The baseband signals may be provided by the baseband circuitry 1104 and may be filtered by filter circuitry 1106c. The filter circuitry 1106c may include a low-pass filter (LPF), although the scope of the aspects is not limited in this respect.

In some aspects, the mixer circuitry 1106a of the receive signal path and the mixer circuitry 1106a of the transmit signal path may include two or more mixers and may be arranged for quadrature downconversion and/or upconversion respectively. In some aspects, the mixer circuitry 1106a of the receive signal path and the mixer circuitry 1106a of the transmit signal path may include two or more mixers and may be arranged for image rejection (e.g., Hartley image rejection). In some aspects, the mixer circuitry 1106a of the receive signal path and the mixer circuitry 1106a may be arranged for direct downconversion and/or direct upconversion, respectively. In some aspects, the mixer circuitry 1106a of the receive signal path and the mixer circuitry 1106a of the transmit signal path may be configured for super-heterodyne operation.

In some aspects, the output baseband signals and the input baseband signals may be analog baseband signals, although the scope of the aspects is not limited in this respect. In some alternate aspects, the output baseband signals and the input baseband signals may be digital baseband signals. In these alternate aspects, the RF circuitry 1106 may include analog-to-digital converter (ADC) and digital-to-analog converter (DAC) circuitry and the baseband circuitry 1104 may include a digital baseband interface to communicate with the RF circuitry 1106.

In some dual-mode aspects, a separate radio IC circuitry may be provided for processing signals for each spectrum, although the scope of the aspects is not limited in this respect.

In some aspects, the synthesizer circuitry 1106d may be a fractional-N synthesizer or a fractional N/N+1 synthesizer, although the scope of the aspects is not limited in this respect as other types of frequency synthesizers may be suitable. For example, synthesizer circuitry 1106d may be a delta-sigma synthesizer, a frequency multiplier, or a synthesizer comprising a phase-locked loop with a frequency divider.

The synthesizer circuitry 1106d may be configured to synthesize an output frequency for use by the mixer circuitry 1106a of the RF circuitry 1106 based on a frequency input and a divider control input. In some aspects, the synthesizer circuitry 1106d may be a fractional N/N+1 synthesizer.

In some aspects, frequency input may be provided by a voltage controlled oscillator (VCO), although that is not a requirement. Divider control input may be provided by either the baseband circuitry 1104 or the applications processor 1102 depending on the desired output frequency. In some aspects, a divider control input (e.g., N) may be determined from a look-up table based on a channel indicated by the applications processor 1102.

Synthesizer circuitry 1106d of the RF circuitry 1106 may include a divider, a delay-locked loop (DLL), a multiplexer and a phase accumulator. In some aspects, the divider may be a dual modulus divider (DMD) and the phase accumulator may be a digital phase accumulator (DPA). In some aspects, the DMD may be configured to divide the input signal by either N or N+1 (e.g., based on a carry out) to provide a fractional division ratio. In some example aspects, the DLL may include a set of cascaded, tunable, delay elements, a phase detector, a charge pump and a D-type flip-flop. In these aspects, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 1106d may be configured to generate a carrier frequency as the output frequency, while in other aspects, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency may be a LO frequency (fLO). In some aspects, the RF circuitry 1106 may include an IQ/polar converter.

FEM circuitry 1108 may include a receive signal path which may include circuitry configured to operate on RF signals received from one or more antennas 1110, amplify the received signals and provide the amplified versions of the received signals to the RF circuitry 1106 for further processing. FEM circuitry 1108 may also include a transmit signal path which may include circuitry configured to amplify signals for transmission provided by the RF circuitry 1106 for transmission by one or more of the one or more antennas 1110.

In some aspects, the FEM circuitry 1108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1106). The transmit signal path of the FEM circuitry 1108 may include a power amplifier (PA) to amplify input RF signals (e.g., provided by RF circuitry 1106), and one or more filters to generate RF signals for subsequent transmission (e.g., by one or more of the one or more antennas 1110).

In some aspects, the electronic device 1100 may include additional elements such as, for example, memory/storage, display, camera, sensor, and/or input/output (I/O) interface.

In some aspects, the electronic device 1100, or elements of the electronic device 1100 such as the RF circuitry 1106 and/or the baseband circuitry 1104, may be configured to: receive information provided from a general authorized access (GAA) entity of a GAA network; estimate, based on the information, interference to the PAL network from one or more GAA entities of the GAA network; identify a result of a comparison of the estimate to a threshold value; and identify an exclusion zone based on the result.

In some aspects, the electronic device 1100, or elements of the electronic device 1100 such as the RF circuitry 1106 and/or the baseband circuitry 1104, may be configured to: provide, to a priority access license (PAL) entity of a PAL network via an inter-spectrum access system (SAS) or inter-licensed shared access (LSA) interface, information related to one or more GAA entities of the GAA network; receive, from the PAL entity via the inter-SAS or inter-LSA interface, an indication of a PAL exclusion zone based on the information; and transmit or withhold transmission of a GAA signal based on the indication of the PAL exclusion zone.

Figure 12:
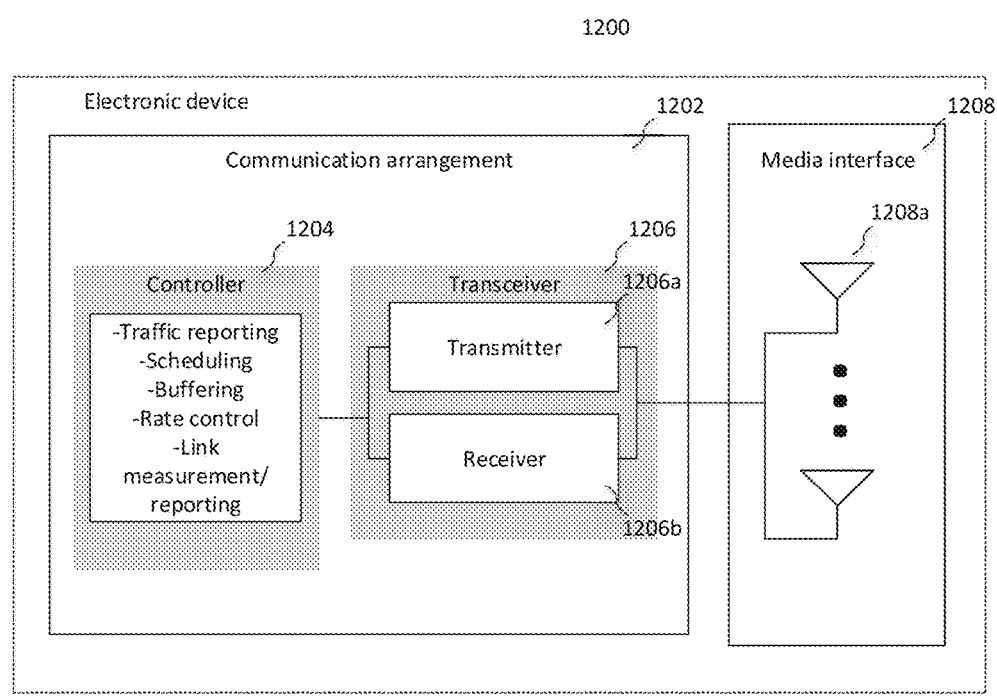
FIG. 12 shows an exemplary configuration of electronic device circuitry according to some aspects.

FIG. 12 illustrates electronic device circuitry 1200 in accordance with some aspects. The electronic device circuitry 1200 may be, may implement, may be incorporated into, or may otherwise be a part of, an eNB (for example, an MeNB or the SeNB), a core network (CN) device, or a UE.

A CN device may be part of a core network (or an evolved packet core (EPC) in system architecture evolution (SAE)) that is responsible for overall control of a UE and establishment of bearers, which may be internet protocol (IP) packet flows with a defined quality of service (QoS). In some aspects, the CN device may be considered to be at an edge of the core network and may, therefore, be referred to as an edge cloud device. The CN device may include a serving gateway (S-GW) that serves as a local mobility anchor for data bearers when the UE is in an idle state and may temporarily buffer downlink data while a mobility management entity (MME) of the CN initiates paging of the UE to reestablish bearers. The S-GW may also perform administrative functions in a visited network (for example, collecting data usage statistics for charging purposes).

In some aspects, the CN device may additionally/alternatively include one or more other logical nodes of the CN. For example, the CN device may include a packet data network (PDN) gateway (P-GW) that is responsible for IP address allocation for a UE, as well as quality of service (QoS) enforcement and flow-based charging according to rules from a policy and charging rules function (PCRF). The CN device may additionally/alternatively include an MME, which may be a control node that processes signaling between a UE and the CN, for example, signaling based on non-access stratum (NAS) protocols. The MME may perform functions related to bearer management (for example, establishing, maintaining, and releasing bearers, as handled by the session management layer in the NAS protocol); related to connection management (for example, establishing connections and security between the CN and the UE, as handled by a connection or mobility management layer in the NAS protocol layer); or related to interworking with other networks.

In aspects, the electronic device circuitry 1200 may include communication circuitry 1202. The communication circuitry 1202 may include control circuitry 1204, transceiver circuitry 1206 that includes both transmit circuitry 1206a and receive circuitry 1206b, and media interface circuitry 1208.

The media interface circuitry 1208 may include circuit elements that are configured to communicatively couple the transceiver circuitry 1206 with a wired or wireless communication medium. In some aspects, the media interface circuitry 1208 may include radio frequency front-end components that may include one or more antenna elements 1208a, as generally shown (for transmission/reception of signals over a wireless medium), amplifiers, filters, etc. In other aspects, the media interface circuitry 1208 may include components for interfacing with other networks. For example, in some aspects, the media interface circuitry 1208 may include an Ethernet interface, for example, ports or other media interfaces such as, but not limited to, coaxial, twisted pair, or fiber-optic physical media interfaces.

The transceiver circuitry 1206 may couple the control circuitry 1204 with the media interface circuitry 1208. The transceiver circuitry 1206 may receive signals from the control circuitry 1204 and perform various signal processing functions to prepare the signals for transmission over an appropriate communication medium by the media interface circuitry 1208. The transceiver circuitry 1206 may also receive signals from the media interface circuitry 1208 and perform various signal processing functions to prepare the signals for transmission to the control circuitry 1204.

In aspects in which the electronic device circuitry 1200 interfaces with a wireless communication media of, for example, the Uu interface, the communication circuitry 1202 may include radio-frequency, mixed-signal, and analog portions and a baseband portion that uses one or more digital signal processors (DSPs) and communication algorithm processing including channel codes.

In aspects in which the electronic device circuitry 1200 interfaces with a wired communication medium of, for example, the S1, X2, or S5/S8 interfaces, the communication circuitry 1202 may provide signal processing according to the appropriate communication network protocols. For example, the communication circuitry 12020 may include an Ethernet controller that implements Ethernet protocols of, for example, 10 Gigabit Ethernet, 1000BASE-T, 100BASE-TX, or 10BASE-T standards.

The control circuitry 1204 may include circuitry to perform link layer (for example, media access control (MAC) layer) and higher-layer operations to facilitate communication over appropriate networks. In some aspects, digital physical layer (PHY) operations may be performed by the control circuitry 1204, as well, with analog PHY operations being performed by the transceiver circuitry 1206.

The control circuitry 1204 may operate to reduce radio channel capacity fluctuation in communications made between the core network and the UE. The control circuitry 1204 may perform various access-network control operations to enable opportunistic access of communication links in a high-frequency band in a manner to reduce radio channel capacity fluctuation and provide reliable communication over the air interface. In particular, the access-network control operations may include traffic reporting, scheduling, buffering/caching, traffic shaping, rate control, etc.

In some aspects, the control circuitry 1204 may include a variety of circuitry including, for example, processing and memory circuitry, to perform the operations described herein. In some aspects, the control circuitry 1204 may implement a mobile proxy to provide access-network control operations from a CN device.

In some aspects, the electronic device circuitry 1200 of FIG. 12, or elements of the electronic device circuitry 1200 such as the control circuitry 1204 and/or transceiver circuitry 1206, may be configured to perform one or more of the computations or estimate described herein. In some aspects, the electronic device circuitry 1200 of FIG. 12 may be configured to communicate with another electronic device via an inter-SAS and/or inter-LSA interface as described herein.

Figure 13:
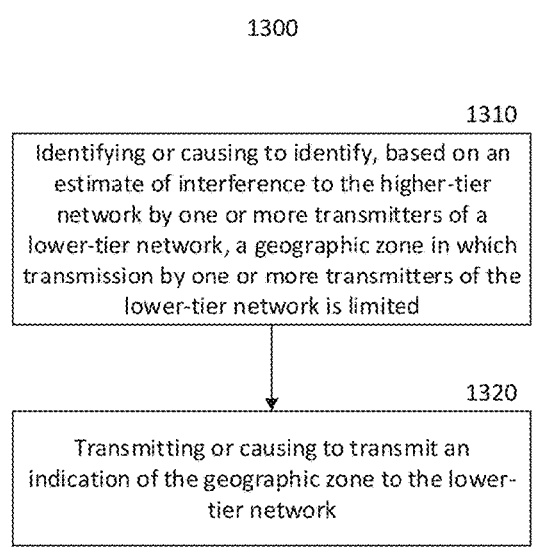
FIG. 13 shows an exemplary method of managing interference at a higher-tier network according to some aspects.

FIG. 13 shows method 1300. As shown in FIG. 13, method 1300 may include identifying or causing to identify, based on an estimate of interference to the higher-tier network by one or more transmitters of a lower-tier network, a geographic zone in which transmission by one or more transmitters of the lower-tier network is limited (1310); and transmitting or causing to transmit an indication of the geographic zone to the lower-tier network (1320). In some aspects, method 1300 may be performed by a shared spectrum network device that includes at least control circuitry 1204 of electronic device circuitry 1200 and is located in a higher-tier network. The shared spectrum network device may be located in the core network, at a base station or access point, or in an edge network between the core network and radio access network. In some aspects, the shared spectrum network device may perform the process of method 1300 at control circuitry 1204, which includes identifying a geographic zone for limited transmission based on interference and transmitting the geographic zone (e.g., via a software-level connection) to a counterpart device in a lower-tier network. Control circuitry 1204 may therefore include one or more processors configured to retrieve (e.g., from a non-transitory computer readable medium) and execute program code defining the algorithmic process described and shown above for FIGS. 4-10, in particular including generating interference estimates and determining geographic zones for limited transmission based on the geographic zones as described in FIGS. 4 and 5 for the PAL network. In aspects where the shared spectrum network device is located at a base station or access point, the shared spectrum network device may also include transceiver circuitry 1206 and media interface circuitry 1208, which control circuitry 1204 may use to transmit and receive communication data as radio signals. In aspects where the shared spectrum network device is located in the core network, the shared spectrum network device may be a server-type component including control circuitry 1204 (e.g., one or more processors), which may execute the process of method 1500 at a server location and interface with counterpart devices (e.g., of the lower-tier network) via software-level connections.

Figure 14:
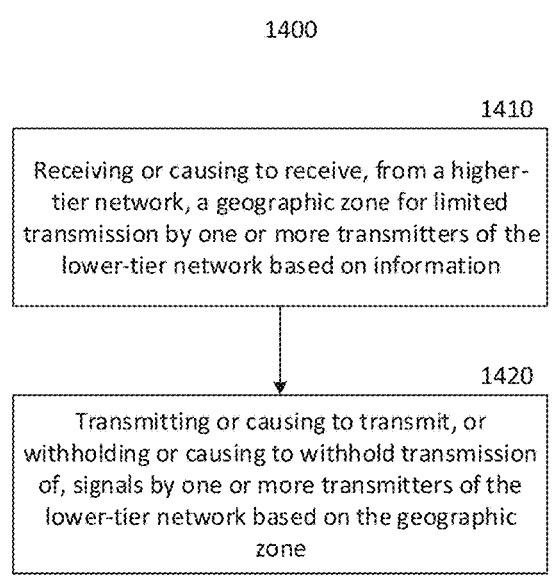
FIG. 14 shows an exemplary method of managing interference at a lower-tier network according to some aspects.

FIG. 14 shows method 1400. As shown in FIG. 14, method 1400 may include receiving or causing to receive, from a higher-tier network, a geographic zone for limited transmission by one or more transmitters of the lower-tier network based on information (1410); and transmitting or causing to transmit, or withholding or causing to withhold transmission of, signals by one or more transmitters of the lower-tier network based on the geographic zone (1420). In some aspects, method 1400 may be performed by a shared spectrum network device that includes at least control circuitry 1204 electronic device circuitry 1200 and is located in a lower-tier network. The shared spectrum network device may be located in the core network, at a base station or access point, or in an edge network between the core network and radio access network. In some aspects, the shared spectrum network device may perform the process of method 1400 at control circuitry 1204, which includes receiving (e.g., via a software-level connection with a counterpart device in the higher-tier network) a geographic zone for limited transmission and transmitting or withholding transmission of signals by one or more transmitters of the lower-tier network. Control circuitry 1204 may therefore include one or more processors configured to retrieve (e.g., from a non-transitory computer readable medium) and execute program code defining the algorithmic process described and shown above for FIGS. 4-10, in particular including receiving geographic zone information and limiting transmission in the geographic zone as described in FIG. 4 for the GAA network. In aspects where the shared spectrum network device is located at a base station or access point, the shared spectrum network device may also include transceiver circuitry 1206 and media interface circuitry 1208, which control circuitry 1204 may use to transmit and receive communication data as radio signals, and may also transmit or withhold transmission by transmitting or withholding transmission by transceiver circuitry 1206 and media interface circuitry 1208. Control circuitry 1204 may also use transceiver circuitry 1206 and media interface circuitry 1208 to transmit instructions to UEs of the lower-tier network to limit transmission when in the geographic zone. In aspects where the shared spectrum network device is located in the core network, the shared spectrum network device may be a server-type component including control circuitry 1204 (e.g., one or more processors), which may execute the process of method 1500 at a server location and interface with counterpart devices (e.g., of the higher-tier network) via software-level connections. Control circuitry 1204 may interface with base stations or access points of the lower-tier network via such a software-level connection to cause the base stations or access points to transmit or withhold transmission of radio signals when in the geographic zone. In some aspects, the base stations or access points may also transmit instructions to UEs of the lower-tier network to limit transmissions when in the geographic zone.

Figure 15:
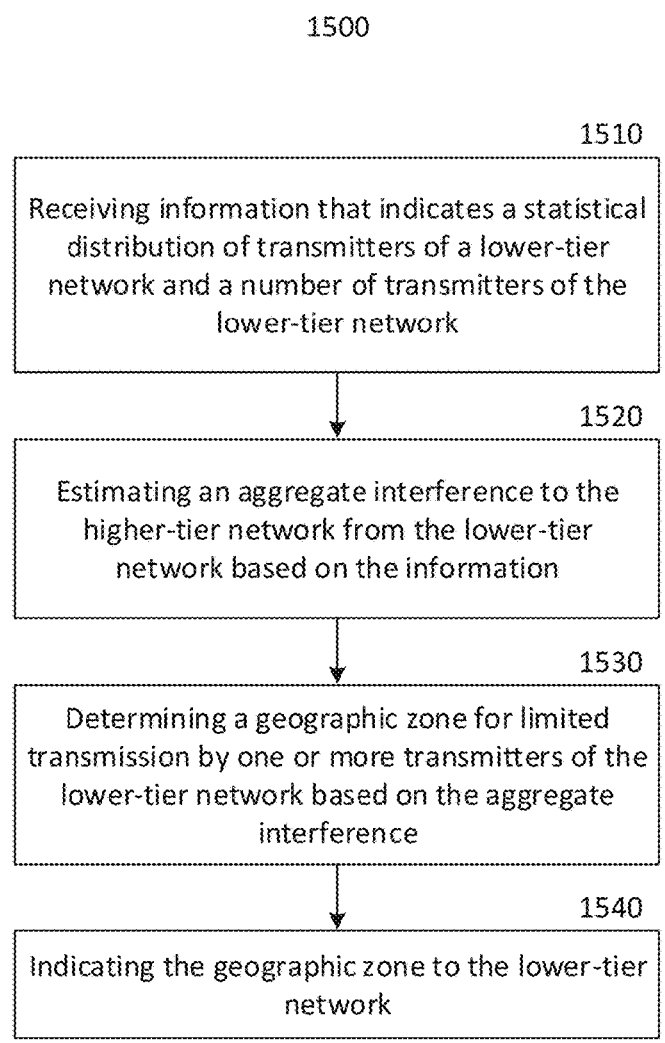
FIG. 15 shows an exemplary method operating in a shared spectrum network that is shared between at least a higher-tier network and a lower-tier network according to some aspects.

FIG. 15 shows method 1500 of operating in a shared spectrum network that is shared between at least a higher-tier network, a lower-tier network. As shown in FIG. 15, method 1500 includes receiving information that indicates a statistical distribution of transmitters of a lower-tier network and a number of transmitters of the lower-tier network (1510); estimating an aggregate interference to the higher-tier network from the lower-tier network based on the information (1520); determining a geographic zone for limited transmission by one or more transmitters of the lower-tier network based on the aggregate interference (1530); and indicating the geographic zone to the lower-tier network (1540). In some aspects, method 1500 may be performed by a shared spectrum network device that includes at least control circuitry 1204 of electronic device circuitry 1200 and is located in a higher-tier network. The shared spectrum network device may be located in the core network, at a base station or access point, or in an edge network between the core network and radio access network.

In some aspects, the shared spectrum network device may perform the process of method 1500 at control circuitry 1204, which includes estimating aggregate interference to the higher-tier network, determining a geographic zone for limited transmission, and indicating the geographic zone (e.g., via a software-level connection) to a counterpart device in a lower-tier network. Control circuitry 1204 may therefore include one or more processors configured to retrieve (e.g., from a non-transitory computer readable medium) and execute program code defining the algorithmic process described and shown above for FIGS. 4-10, in particular including generating interference estimates and determining geographic zones for limited transmission based on the geographic zones as described in FIGS. 4 and 5 for the PAL network. In aspects where the shared spectrum network device is located at a base station or access point, the shared spectrum network device may also include transceiver circuitry 1206 and media interface circuitry 1208, which control circuitry 1204 may use to transmit and receive communication data as radio signals. In aspects where the shared spectrum network device is located in the core network, the shared spectrum network device may be a server-type component including control circuitry 1204 (e.g., one or more processors), which may execute the process of method 1500 at a server location and interface with counterpart devices (e.g., of the lower-tier network) via software-level connections.

In some aspects, electronic device circuitry 1200 may be a shared spectrum network device in a higher-tier network including one or more processors (control circuitry 1204) configured to receive information provided from a lower-tier network, estimate, based on the information, interference to the higher-tier network from one or more transmitters of the lower-tier network, compare the estimated interference to a threshold value, and identify a geographic zone in which transmission by one or more transmitters of the lower-tier network is limited based on the comparison. In some aspects, electronic device circuitry 1200 may be electronic device configured for operation in a higher-tier network including one or more processors (control circuitry 1204) configured to receive, information that indicates a statistical distribution of transmitters of a lower-tier network and a number of transmitters of the lower-tier network, estimate an aggregate interference to the higher-tier network from the lower-tier network based on the information, determine a geographic zone for limited transmission by one or more transmitters of the lower-tier network based on the aggregate interference, and indicate the geographic zone to the lower-tier network.

The following examples pertain to further aspects of this disclosure:

Example 1 may include a priority access license (PAL) entity of a PAL network, the PAL entity comprising: means to estimate interference to the PAL network from one or more general authorized access (GAA) entities of a GAA network; means to identify a result of a comparison of the estimate to a threshold value; and means to identify an exclusion zone based on the result.

Example 2 may include the PAL entity of Example 1 or some other example herein, wherein the estimate is based on information provided by the GAA network.

Example 3 may include the PAL entity of Example 2 or some other example herein, wherein the GAA information includes an indication of a number of the one or more GAA entities of the GAA network and/or an indication of transmit power of the one or more GAA entities of the GAA network.

Example 4 may include the PAL entity of Example 2 or some other example herein, further comprising means to receive the information via an inter-spectrum access system (SAS) or inter-licensed shared access (LSA) interface.

Example 5 may include the PAL entity of Example 1 or some other example herein, wherein the PAL network and the GAA network are networks of different spectrum access systems (SASs) and/or licensed shared access (LSA) networks.

Example 6 may include the PAL entity of Example 1 or some other example herein, further comprising means to transmit an indication of the exclusion zone to one or more GAA entities of the GAA network.

Example 7 may include the PAL entity of Example 1 or some other example herein, wherein the means to identify the exclusion zone are to identify the exclusion zone based on a minimum exclusion zone area or a maximum GAA capacity.

Example 8 may include the PAL entity of Example 1 or some other example herein, wherein one or more GAA entities of the GAA network are to not transmit if they are located in the exclusion zone.

Example 9 may include the PAL entity of Example 1 or some other example herein, wherein the result is related to whether the estimate is below the threshold.

Example 10 may include the PAL entity of Example 1 or some other example herein, wherein the estimate is related to a probability density function (PDF) and/or a cumulative density function (CDF).

Example 11 may include the PAL entity of Example 1 or some other example herein, wherein the means to estimate interference are to perform the estimate without knowledge of location of the one or more GAA entities.

Example 12 may include the PAL entity of any of Examples 1-11, wherein the PAL entity is an evolved NodeB (eNB), a user equipment (UE), a citizen's broadband radio service device (CBSD), and/or some other electronic device of the PAL network.

Example 13 may include a general authorized access (GAA) entity of a GAA network comprising: means to provide, to a priority access license (PAL) entity of a PAL network, information related to one or more GAA entities of the GAA network; means to receive, from the PAL entity, an indication of a PAL exclusion zone based on the information; and means to transmit or withhold transmission of a GAA signal based on the indication of the PAL exclusion zone.

Example 14 may include the GAA entity of Example 13 or some other example herein, wherein the information includes an indication of a number of GAA entities of the GAA network and/or an indication of transmit power of respective GAA entities of the GAA network.

Example 15 may include the GAA entity of Example 13 or some other example herein, further comprising means to provide the GAA information or receive the indication via an inter-spectrum access system (SAS) or inter-licensed shared access (LSA) interface.

Example 16 may include the GAA entity of Example 13 or some other example herein, wherein the PAL network and the GAA network are networks of different spectrum access systems (SASs) and/or licensed shared access (LSA) networks.

Example 17 may include the GAA entity of Example 13 or some other example herein, wherein the means to transmit or withhold transmission are to withhold the transmission if the GAA entity is within the PAL exclusion zone.

Example 18 may include the GAA entity of Example 13 or some other example herein, wherein the information does not include an indication of a location of the one or more GAA entities of the GAA network.

Example 19 may include the GAA entity of any of Examples 13-18, wherein the GAA entity is an evolved NodeB (eNB), a user equipment (UE), a citizen's broadband radio service device (CBSD), and/or some other electronic device of the GAA network.

Example 20 may include a priority access license (PAL) entity of a PAL network, the PAL entity to: receive information provided from a general authorized access (GAA) entity of a GAA network; estimate, based on the information, interference to the PAL network from one or more GAA entities of the GAA network; identify a result of a comparison of the estimate to a threshold value; and identify an exclusion zone based on the result.

Example 21 may include the PAL entity of Example 20 or some other example herein, wherein the information includes an indication of a number of the one or more GAA entities of the GAA network and/or an indication of transmit power of the one or more GAA entities of the GAA network.

Example 22 may include the PAL entity of Example 20 or some other example herein, wherein the PAL entity is further to receive the information via an inter-spectrum access system (SAS) or inter-licensed shared access (LSA) interface.

Example 23 may include the PAL entity of Example 20 or some other example herein, wherein the PAL network and the GAA network are networks of different spectrum access systems (SASs) and/or licensed shared access (LSA) networks.

Example 24 may include the PAL entity of Example 20 or some other example herein, wherein the PAL entity is further to transmit an indication of the exclusion zone to one or more GAA entities of the GAA network.

Example 25 may include the PAL entity of Example 20 or some other example herein, wherein the PAL entity is further to identify the exclusion zone based on a minimum exclusion zone area or a maximum GAA capacity.

Example 26 may include the PAL entity of Example 20 or some other example herein, wherein one or more GAA entities of the GAA network are to not transmit if they are located in the exclusion zone.

Example 27 may include the PAL entity of Example 20 or some other example herein, wherein the result is related to whether the estimate is below the threshold.

Example 28 may include the PAL entity of Example 20 or some other example herein, wherein the estimate is related to a probability density function (PDF) and/or a cumulative density function (CDF).

Example 29 may include the PAL entity of Example 20 or some other example herein, wherein the PAL entity is further to perform the estimate without knowledge of location of the one or more GAA entities.

Example 30 may include the PAL entity of any of Examples 20-29, wherein the PAL entity is an evolved NodeB (eNB), a user equipment (UE), a citizen's broadband radio service device (CBSD), and/or some other electronic device of the PAL network.

Example 31 may include a general authorized access (GAA) entity of a GAA network, the GAA entity to: provide, to a priority access license (PAL) entity of a PAL network via an inter-spectrum access system (SAS) or inter-licensed shared access (LSA) interface, information related to one or more GAA entities of the GAA network; receive, from the PAL entity via the inter-SAS or inter-LSA interface, an indication of a PAL exclusion zone based on the information; and transmit or withhold transmission of a GAA signal based on the indication of the PAL exclusion zone.

Example 32 may include the GAA entity of Example 31 or some other example herein, wherein the information includes an indication of a number of GAA entities of the GAA network and/or an indication of transmit power of respective GAA entities of the GAA network.

Example 33 may include the GAA entity of Example 31 or some other example herein, wherein the PAL network and the GAA network are networks of different SAS and/or LSA networks.

Example 34 may include the GAA entity of Example 31 or some other example herein, wherein the GAA entity is to withhold the transmission if the GAA entity is within the PAL exclusion zone.

Example 35 may include the GAA entity of Example 31 or some other example herein, wherein the information does not include an indication of a location of the one or more GAA entities of the GAA network.

Example 36 may include the GAA entity of any of Examples 31-35, wherein the GAA entity is an evolved NodeB (eNB), a user equipment (UE), a citizen's broadband radio service device (CBSD), and/or some other electronic device of the GAA network.

Example 37 may include a method comprising: identifying or causing to identify, based on an estimate of interference to a priority access license (PAL) entity of a PAL network from one or more general authorized access (GAA) entity of a GAA network, an exclusion zone; and transmitting or causing to transmit an indication of the exclusion zone to the one or more GAA entities.

Example 38 may include the method of Example 37 or some other example herein, wherein the estimate is based on information provided by the GAA network.

Example 39 may include the method of Example 38 or some other example herein, wherein the GAA information includes an indication of a number of the one or more GAA entities of the GAA network and/or an indication of transmit power of the one or more GAA entities of the GAA network.

Example 40 may include the method of Example 38 or some other example herein, further comprising receiving or causing to receive the information via an inter-spectrum access system (SAS) or inter-licensed shared access (LSA) interface.

Example 41 may include the method of Example 37 or some other example herein, wherein the PAL network and the GAA network are networks of different spectrum access systems (SASs) and/or licensed shared access (LSA) networks.

Example 42 may include the method of Example 37 or some other example herein, further comprising transmitting or causing to transmit an indication of the exclusion zone to one or more GAA entities of the GAA network.

Example 43 may include the method of Example 37 or some other example herein, wherein the identifying or causing to identify the exclusion zone includes identifying or causing to identify the exclusion zone based on a minimum exclusion zone area or a maximum GAA capacity.

Example 44 may include the method of Example 37 or some other example herein, wherein one or more GAA entities of the GAA network are to not transmit if they are located in the exclusion zone.

Example 45 may include the method of Example 37 or some other example herein, wherein the exclusion zone is based on whether the estimate is below a threshold.

Example 46 may include the method of Example 37 or some other example herein, wherein the estimate is related to a probability density function (PDF) and/or a cumulative density function (CDF).

Example 47 may include the method of Example 37 or some other example herein, wherein the estimate of the interference is not based on knowledge of location of the one or more GAA entities.

Example 48 may include the method of any of Examples 37-47, wherein the method is performed by an evolved NodeB (eNB), a user equipment (UE), a citizen's broadband radio service device (CBSD), and/or some other electronic device of the PAL network.

Example 49 may include a method comprising: receiving or causing to receive, from a priority access license (PAL) entity of a PAL network, an indication of a PAL exclusion zone based on information related to one or more general authorized access (GAA) entities of a GAA network; and transmitting or causing to transmit, or withholding or causing to withhold transmission, of a GAA signal based on the indication of the PAL exclusion zone.

Example 50 may include the method of Example 49 or some other example herein, wherein the information includes an indication of a number of GAA entities of the GAA network and/or an indication of transmit power of respective GAA entities of the GAA network.

Example 51 may include the method of Example 49 or some other example herein, further comprising providing or causing to provide the GAA information, or receiving or causing to receive the indication, via an inter-spectrum access system (SAS) or inter-licensed shared access (LSA) interface.

Example 52 may include the method of Example 49 or some other example herein, wherein the PAL network and the GAA network are networks of different spectrum access systems (SASs) and/or licensed shared access (LSA) networks.

Example 53 may include the method of Example 49 or some other example herein, further comprising withholding or causing to withhold the transmission if the GAA entity is within the PAL exclusion zone.

Example 54 may include the method of Example 49 or some other example herein, wherein the information does not include an indication of a location of the one or more GAA entities of the GAA network.

Example 55 may include the method of any of Examples 49-54, wherein the GAA entity is an evolved NodeB (eNB), a user equipment (UE), a citizen's broadband radio service device (CBSD), and/or some other electronic device of the GAA network.

Example 56 may include a new way of using exclusion zone to protect PAL from GAA users.

Example 57 may include a provision of distributions of GAA characteristics (location and transmit power) interference mitigation.

Example 58 may include the use of dynamic exclusion zones to protect PAL from GAA.

Example 59 may include the interference mitigation in SAS without full knowledge of transmit locations.

Example 60 may include the PAL GAA co-channel interference mitigation procedure for tiered spectrum sharing systems.

Example 61 may include the design of inter-SAS interface to provide interference mitigation.

Example 62 may include an apparatus comprising means to perform one or more elements of a method described in or related to any of Examples 1-61, or any other method or process described herein.

Example 63 may include one or more non-transitory computer-readable media comprising instructions to cause an electronic device, upon execution of the instructions by one or more processors of the electronic device, to perform one or more elements of a method described in or related to any of Examples 1-61, or any other method or process described herein.

Example 64 may include an apparatus comprising logic, modules, and/or circuitry to perform one or more elements of a method described in or related to any of Examples 1-61, or any other method or process described herein.

Example 65 may include a method, technique, or process as described in or related to any of Examples 1-61, or portions or parts thereof Example 66 may include an apparatus comprising: one or more processors and one or more computer readable media comprising instructions that, when executed by the one or more processors, cause the one or more processors to perform the method, techniques, or process as described in or related to any of Examples 1-61, or portions thereof Example 67 may include a method of communicating in a wireless network as shown and described herein.

Example 68 may include a system for providing wireless communication as shown and described herein.

Example 69 may include a device for providing wireless communication as shown and described herein.

Example 70 is a shared spectrum network device in a higher-tier network, the shared spectrum network device including one or more processors configured to receive information provided from a lower-tier network, estimate, based on the information, interference to the higher-tier network from one or more transmitters of the lower-tier network, compare the estimated interference to a threshold value, and identify a geographic zone in which transmission by one or more transmitters of the lower-tier network is limited based on the comparison.

In Example 71, the subject matter of Example 70 can optionally include wherein the geographic zone in which transmission by one or more transmitters of the lower-tier network is limited is an exclusion zone in which one or more transmitters of the lower-tier network are prohibited to transmit.

In Example 72, the subject matter of Example 70 can optionally include wherein the geographic zone in which transmission by one or more transmitters of the lower-tier network is limited is a protection zone in which no harmful interference caused by transmitters of the lower-tier network affects one or more receivers of the higher-tier network.

In Example 73, the subject matter of Example 70 can optionally include wherein the geographic zone in which transmission by one or more transmitters of the lower-tier network is limited is a restriction zone in which one or more transmitters of the lower-tier network are allowed to transmit under restrictive conditions.

In Example 74, the subject matter of Example 70 can optionally include wherein the information includes an indication of a number of the one or more transmitters of the lower-tier network or an indication of transmit power of the one or more transmitters of the lower-tier network.

In Example 75, the subject matter of Example 70 can optionally include wherein the higher-tier network is a priority access license (PAL) network and wherein the lower-tier network is a general authorized access (GAA) network.

In Example 76, the subject matter of Example 70 can optionally include wherein the one or more processors are further configured to receive the information from the lower-tier network via an inter-spectrum access system (SAS) interface or an inter-licensed shared access (LSA) interface.

In Example 77, the subject matter of Example 70 can optionally include wherein the one or more processors are further configured to transmit an indication of the geographic zone to the lower-tier network.

In Example 78, the subject matter of Example 70 can optionally include wherein the comparison includes determining whether the estimated interference is below the threshold value.

Example 79 is a shared spectrum network device in a lower-tier network including one or more processors configured to generate and transmit, to the higher-tier network via an interface, information related to one or more transmitters of the lower-tier network, receive, from the higher-tier network via the interface, a geographic zone of limited transmission by one or more transmitters of the lower-tier network based on the information, and transmit or withhold transmission of signals by one or more transmitters of the lower-tier network based on the geographic zone.

In Example 80, the subject matter of Example 79 can optionally include wherein the higher-tier network is a priority access license (PAL) network and the lower-tier network is a general authorized access (GAA) network, and wherein the interface is an inter-spectrum access system (SAS) or an inter-licensed shared access (LSA) interface.

In Example 81, the subject matter of Example 79 can optionally include wherein the information includes an indication of a number of transmitters of the lower-tier network or an indication of transmit power of transmitters of the lower-tier network.

In Example 82, the subject matter of Example 79 can optionally include wherein the geographic zone is an exclusion zone in which one or more transmitters of the lower-tier network are prohibited to transmit.

In Example 83, the subject matter of Example 79 can optionally include wherein the geographic zone is a protection zone in which no harmful interference caused by transmitters of the lower-tier network affects one or more receivers of the higher-tier network.

In Example 84, the subject matter of Example 79 can optionally include wherein the geographic zone is a restriction zone in which one or more transmitters of the lower-tier network are allowed to transmit under restrictive conditions.

Example 85 is a method for operating a shared spectrum network device in a higher-tier network, the method including identifying or causing to identify, based on an estimate of interference to the higher-tier network by one or more transmitters of a lower-tier network, a geographic zone in which transmission by one or more transmitters of the lower-tier network is limited, and transmitting or causing to transmit an indication of the geographic zone to the lower-tier network.

In Example 86, the subject matter of Example 85 can optionally include wherein the geographic zone in which transmission by one or more transmitters of the lower-tier network is limited is an exclusion zone in which transmitters of the lower-tier network are prohibited to transmit.

In Example 87, the subject matter of Example 85 can optionally include wherein the geographic zone in which transmission by one or more transmitters of the lower-tier network is limited is a protection zone in which no harmful interference caused by transmitters of the lower-tier network affects one or more receivers of the higher-tier network.

In Example 88, the subject matter of Example 85 can optionally include wherein the geographic zone in which transmission by one or more transmitters of the lower-tier network is limited is a restriction zone in which one or more transmitters of the lower-tier network are allowed to transmit under restrictive conditions.

In Example 89, the subject matter of Example 85 can optionally include wherein the higher-tier network is a priority access license (PAL) network and wherein the lower-tier network is a general authorized access (GAA) network.

In Example 90, the subject matter of Example 85 can optionally include wherein the estimate is based on information provided to the higher-tier network by the lower-tier network that includes an indication of a number of transmitters of the lower-tier network or an indication of transmit power of transmitters of the lower-tier network.

In Example 91, the subject matter of Example 85 can optionally further include receiving or causing to receive the information via an inter-spectrum access system (SAS) interface or an inter-licensed shared access (LSA) interface.

In Example 92, the subject matter of Example 85 can optionally further include transmitting or causing to transmit an indication of the geographic zone to the lower-tier network.

In Example 93, the subject matter of Example 85 can optionally include wherein the method is performed by an evolved NodeB (eNB), a user equipment (UE), a citizen's broadband radio service device (CBSD), or another electronic device of the higher-tier network.

Example 94 is a method for operating a shared spectrum network device in a lower-tier network, the method including receiving or causing to receive, from a higher-tier network, a geographic zone for limited transmission by one or more transmitters of the lower-tier network based on information, and transmitting or causing to transmit, or withholding or causing to withhold transmission of, signals by one or more transmitters of the lower-tier network based on the geographic zone.

In Example 95, the subject matter of Example 94 can optionally include wherein the geographic zone is an exclusion zone in which one or more transmitters of the lower-tier network are prohibited to transmit.

In Example 96, the subject matter of Example 94 can optionally include wherein the geographic zone is a protection zone in which no harmful interference caused by transmitters of the lower-tier network affects one or more receivers of the higher-tier network.

In Example 97, the subject matter of Example 94 can optionally include wherein the geographic zone is a restriction zone in which one or more transmitters of the lower-tier network are allowed to transmit under restrictive conditions.

In Example 98, the subject matter of Example 94 can optionally include wherein the higher-tier network is a priority access license (PAL) network and the lower-tier network is a general authorized access (GAA) network.

In Example 99, the subject matter of Example 94 can optionally include wherein transmitting or causing to transmit, or withholding or causing to withhold transmission of, includes withholding or causing to withhold transmission if the one or more transmitters are within the geographic zone.

In Example 100, the subject matter of Example 94 can optionally include wherein the information includes an indication of a number of transmitters of the lower-tier network or an indication of transmit power of one or more transmitters of the lower-tier network.

In Example 101, the subject matter of Example 94 can optionally include wherein the shared spectrum network device is an evolved NodeB (eNB), a user equipment (UE), or a citizen's broadband radio service device (CBSD).

Example 102 is a method of operating a shared spectrum network device in a higher-tier network, the method including receiving information that indicates a statistical distribution of transmitters of a lower-tier network and a number of transmitters of the lower-tier network, estimating an aggregate interference to the higher-tier network from the lower-tier network based on the information, determining a geographic zone for limited transmission by one or more transmitters of the lower-tier network based on the aggregate interference, and indicating the geographic zone to the lower-tier network.

In Example 103, the subject matter of Example 102 can optionally include wherein the geographic zone is an exclusion zone in which one or more transmitters of the lower-tier network are prohibited to transmit.

In Example 104, the subject matter of Example 102 can optionally include wherein the geographic zone is a protection zone in which no harmful interference caused by transmitters of the lower-tier network affects one or more receivers of the higher-tier network.

In Example 105, the subject matter of Example 102 can optionally include wherein the geographic zone is a restriction zone in which one or more transmitters of the lower-tier network are allowed to transmit under restrictive conditions.

In Example 106, the subject matter of Example 102 can optionally include wherein estimating the aggregate interference to the higher-tier network from the lower-tier network based on the information includes estimating interference to the higher-tier network from a single transmitter of the lower-tier network based on the statistical distribution to obtain a single transmitter interference estimate, and estimating interference to the higher-tier network from multiple transmitters of the lower-tier network based on the single transmitter interference estimate and the number of transmitters to obtain the aggregate interference.

In Example 107, the subject matter of Example 102 or 106 can optionally include wherein the information does not indicate specific locations of transmitters of the lower-tier network.

In Example 108, the subject matter of any one of Examples 102 to 107 can optionally include wherein the higher-tier network is a Spectrum Access System (SAS) Priority Access License (PAL) network, and the lower-tier network is a SAS General Authorized Access (GAA) network.

In Example 109, the subject matter of any one of Examples 102 to 107 can optionally include wherein the higher-tier network is a Spectrum Access System (SAS) incumbent network, and the lower-tier network is a SAS Priority Access License (PAL) network or a SAS General Authorized Access (GAA) network.

In Example 110, the subject matter of any one of Examples 102 to 107 can optionally include wherein the higher-tier network and the lower-tier network are part of a Licensed Shared Access (LSA) network.

In Example 111, the subject matter of any one of Examples 102 to 107 can optionally include wherein the higher-tier network and the lower-tier network share spectrum with an incumbent network as part of a shared spectrum network.

In Example 112, the subject matter of any one of Examples 102 to 107 can optionally include wherein the higher-tier network and the lower-tier network are part of a shared spectrum network that is a narrowband Internet of Things (IoT) network or a Device-to-Device (D2D) network having a tiered hierarchy.

In Example 113, the subject matter of any one of Examples 102 to 112 can optionally include wherein determining the geographic zone for limited transmission by one or more transmitters of the lower-tier network based on the aggregate interference includes determining the geographic zone based on whether the aggregate interference exceeds an interference threshold.

In Example 114, the subject matter of any one of Examples 102 to 112 can optionally include wherein the statistical distribution is a probability density function (PDF), and wherein estimating the aggregate interference to the higher-tier network from the lower-tier network based on the information includes obtaining a PDF of the aggregate interference, and wherein determining the geographic zone for limited transmission by one or more transmitters of the lower-tier network based on the aggregate interference includes obtaining a cumulative distribution function (CDF) of the aggregate interference and obtaining the probability that the aggregate interference is below an interference threshold based on the CDF.

In Example 115, the subject matter of any one of Examples 102 to 114 can optionally include wherein the shared spectrum network device is an evolved NodeB (eNB), a user equipment (UE), a citizen's broadband radio service device (CBSD), or another electronic device of the higher-tier network.

Example 116 is an electronic device configured for operation in a higher-tier network, the electronic device including one or more processors configured to receive, information that indicates a statistical distribution of transmitters of a lower-tier network and a number of transmitters of the lower-tier network, estimate an aggregate interference to the higher-tier network from the lower-tier network based on the information, determine a geographic zone for limited transmission by one or more transmitters of the lower-tier network based on the aggregate interference, and indicate the geographic zone to the lower-tier network.

In Example 117, the subject matter of Example 116 can optionally include wherein the geographic zone is an exclusion zone in which one or more transmitters of the lower-tier network are prohibited to transmit.

In Example 118, the subject matter of Example 116 can optionally include wherein the geographic zone is a protection zone in which no harmful interference caused by transmitters of the lower-tier network affects one or more receivers of the higher-tier network.

In Example 119, the subject matter of Example 116 can optionally include wherein the geographic zone is a restriction zone in which one or more transmitters of the lower-tier network are allowed to transmit under restrictive conditions.

In Example 120, the subject matter of Example 116 can optionally include wherein the one or more processors are configured to estimate the aggregate interference to the higher-tier network from the lower-tier network based on the information by estimating interference to the higher-tier network from a single transmitter of the lower-tier network based on the statistical distribution to obtain a single transmitter interference estimate, and estimating interference to the higher-tier network from multiple transmitters of the lower-tier network based on the single transmitter interference estimate and the number of transmitters to obtain the aggregate interference.

In Example 121, the subject matter of Example 116 or 120 can optionally include wherein the information does not indicate specific locations of transmitters of the lower-tier network.

In Example 122, the subject matter of any one of Examples 116 to 121 can optionally include wherein the higher-tier network is a Spectrum Access System (SAS) Priority Access License (PAL) network, and the lower-tier network is a SAS General Authorized Access (GAA) network.

In Example 123, the subject matter of any one of Examples 116 to 121 can optionally include wherein the higher-tier network is a Spectrum Access System (SAS) incumbent network, and the lower-tier network is a SAS Priority Access License (PAL) network or a SAS General Authorized Access (GAA) network.

In Example 124, the subject matter of any one of Examples 116 to 121 can optionally include wherein the higher-tier network and the lower-tier network are part of a Licensed Shared Access (LSA) network.

In Example 125, the subject matter of any one of Examples 116 to 121 can optionally include wherein higher-tier network and the lower-tier network share spectrum with an incumbent network as part of a shared spectrum network.

In Example 126, the subject matter of any one of Examples 116 to 121 can optionally include wherein the higher-tier network and the lower tier-network are part of a shared spectrum network that is a narrowband Internet of Things (IoT) network or a Device-to-Device (D2D) network having a tiered hierarchy.

In Example 127, the subject matter of any one of Examples 116 to 126 can optionally include wherein the one or more processors are configured to determine the geographic zone for limited transmission by one or more transmitters of the lower-tier network based on the aggregate interference by determining the geographic zone based on whether the aggregate interference exceeds an interference threshold.

In Example 128, the subject matter of any one of Examples 116 to 126 can optionally include wherein the statistical distribution is a probability density function (PDF), and wherein the one or more processors are configured to estimate the aggregate interference to the higher-tier network from the lower-tier network based on the information by obtaining a PDF of the aggregate interference, and wherein the one or more processors are configured to determine the geographic zone for limited transmission by one or more transmitters of the lower-tier network based on the aggregate interference by obtaining a cumulative distribution function (CDF) of the aggregate interference and obtaining the probability that the aggregate interference is below an interference threshold based on the CDF.

Example 129 is a shared spectrum network device in a higher-tier network, the shared spectrum network device including a receiver configured to receive information provided from a lower-tier network, and a controller configured to estimate, based on the information, interference to the higher-tier network from one or more transmitters of the lower-tier network, compare the estimated interference to a threshold value, and identify a geographic zone in which transmission by one or more transmitters of the lower-tier network is limited based on the comparison.

In Example 130, the subject matter of Example 129 can optionally include wherein the geographic zone in which transmission by one or more transmitters of the lower-tier network is limited is an exclusion zone in which one or more transmitters of the lower-tier network are prohibited to transmit.

In Example 131, the subject matter of Example 129 can optionally include wherein the geographic zone in which transmission by one or more transmitters of the lower-tier network is limited is a protection zone in which no harmful interference caused by transmitters of the lower-tier network affects one or more receivers of the higher-tier network.

In Example 132, the subject matter of Example 129 can optionally include wherein the geographic zone in which transmission by one or more transmitters of the lower-tier network is limited is a restriction zone in which one or more transmitters of the lower-tier network are allowed to transmit under restrictive conditions.

In Example 133, the subject matter of Example 129 can optionally include wherein the information includes an indication of a number of the one or more transmitters of the lower-tier network or an indication of transmit power of the one or more transmitters of the lower-tier network.

In Example 134, the subject matter of Example 129 can optionally include wherein the higher-tier network is a priority access license (PAL) network and wherein the lower-tier network is a general authorized access (GAA) network.

In Example 135, the subject matter of Example 129 can optionally include wherein the receiver is further configured to receive the information from the lower-tier network via an inter-spectrum access system (SAS) interface or an inter-licensed shared access (LSA) interface.

In Example 136, the subject matter of Example 129 can optionally further include a transmitter configured to transmit an indication of the geographic zone to the lower-tier network.

In Example 137, the subject matter of Example 129 can optionally include wherein the comparison includes determining whether the estimated interference is below the threshold value.

Example 138 is a shared spectrum network device in a lower-tier network including a controller configured to generate and transmit, to the higher-tier network via an interface, information related to one or more transmitters of the lower-tier network, a receiver configured to receive, from the higher-tier network via the interface, a geographic zone of limited transmission by one or more transmitters of the lower-tier network based on the information, and a transmitter configured to transmit or withhold transmission of signals by one or more transmitters of the lower-tier network based on the geographic zone.

In Example 139, the subject matter of Example 138 can optionally include wherein the higher-tier network is a priority access license (PAL) network and the lower-tier network is a general authorized access (GAA) network, and wherein the interface is an inter-spectrum access system (SAS) or an inter-licensed shared access (LSA) interface.

In Example 140, the subject matter of Example 138 can optionally include wherein the information includes an indication of a number of transmitters of the lower-tier network or an indication of transmit power of transmitters of the lower-tier network.

In Example 141, the subject matter of Example 138 can optionally include wherein the geographic zone is an exclusion zone in which one or more transmitters of the lower-tier network are prohibited to transmit.

In Example 142, the subject matter of Example 138 can optionally include wherein the geographic zone is a protection zone in which no harmful interference caused by transmitters of the lower-tier network affects one or more receivers of the higher-tier network.

In Example 143, the subject matter of Example 138 can optionally include wherein the geographic zone is a restriction zone in which one or more transmitters of the lower-tier network are allowed to transmit under restrictive conditions.

Example 144 is an electronic device configured for operation in a higher-tier network, the electronic device including a receiver configured to receive, information that indicates a statistical distribution of transmitters of a lower-tier network and a number of transmitters of the lower-tier network, and a controller configured to estimate an aggregate interference to the higher-tier network from the lower-tier network based on the information, determine a geographic zone for limited transmission by one or more transmitters of the lower-tier network based on the aggregate interference, and indicate the geographic zone to the lower-tier network.

In Example 145, the subject matter of Example 144 can optionally include wherein the geographic zone is an exclusion zone in which one or more transmitters of the lower-tier network are prohibited to transmit.

In Example 146, the subject matter of Example 144 can optionally include wherein the geographic zone is a protection zone in which no harmful interference caused by transmitters of the lower-tier network affects one or more receivers of the higher-tier network.

In Example 147, the subject matter of Example 144 can optionally include wherein the geographic zone is a restriction zone in which one or more transmitters of the lower-tier network are allowed to transmit under restrictive conditions.

In Example 148, the subject matter of Example 144 can optionally include wherein the controller is configured to estimate the aggregate interference to the higher-tier network from the lower-tier network based on the information by estimating interference to the higher-tier network from a single transmitter of the lower-tier network based on the statistical distribution to obtain a single transmitter interference estimate, and estimating interference to the higher-tier network from multiple transmitters of the lower-tier network based on the single transmitter interference estimate and the number of transmitters to obtain the aggregate interference.

In Example 149, the subject matter of Example 144 or 148 can optionally include wherein the information does not indicate specific locations of transmitters of the lower-tier network.

In Example 150, the subject matter of any one of Examples 144 to 149 can optionally include wherein the higher-tier network is a Spectrum Access System (SAS) Priority Access License (PAL) network, and the lower-tier network is a SAS General Authorized Access (GAA) network.

In Example 151, the subject matter of any one of Examples 144 to 149 can optionally include wherein the higher-tier network is a Spectrum Access System (SAS) incumbent network, and the lower-tier network is a SAS Priority Access License (PAL) network or a SAS General Authorized Access (GAA) network.

In Example 152, the subject matter of any one of Examples 144 to 149 can optionally include wherein the higher-tier network and the lower-tier network are part of a Licensed Shared Access (LSA) network.

In Example 153, the subject matter of any one of Examples 144 to 149 can optionally include wherein higher-tier network and the lower-tier network share spectrum with an incumbent network as part of a shared spectrum network.

In Example 154, the subject matter of any one of Examples 144 to 149 can optionally include wherein the higher-tier network and the lower tier-network are part of a shared spectrum network that is a narrowband Internet of Things (IoT) network or a Device-to-Device (D2D) network having a tiered hierarchy.

In Example 155, the subject matter of any one of Examples 144 to 154 can optionally include wherein the controller is configured to determine the geographic zone for limited transmission by one or more transmitters of the lower-tier network based on the aggregate interference by determining the geographic zone based on whether the aggregate interference exceeds an interference threshold.

In Example 156, the subject matter of any one of Examples 144 to 154 can optionally include wherein the statistical distribution is a probability density function (PDF), and wherein the controller is configured to estimate the aggregate interference to the higher-tier network from the lower-tier network based on the information by obtaining a PDF of the aggregate interference, and wherein the controller is configured to determine the geographic zone for limited transmission by one or more transmitters of the lower-tier network based on the aggregate interference by obtaining a cumulative distribution function (CDF) of the aggregate interference and obtaining the probability that the aggregate interference is below an interference threshold based on the CDF.

The foregoing description of one or more implementations provides illustration and description, but is not intended to be exhaustive or to limit the scope of aspects to the precise form disclosed. Modifications and variations are possible in light of the above teachings or may be acquired from practice of various aspects.

Any of the radio links described or referenced herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, etc.

The demonstrative examples described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies). Applicable spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc.). Some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Hierarchical application of the demonstrative examples described herein is also possible, for example, by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

The demonstrative examples herein can be applied to different Single Carrier or OFDM flavors (CP-OFDM, SC-FDMA, SC-OFDM, filter bank-based multicarrier (FBMC), OFDMA, etc.) and in particular 3GPP NR (New Radio), such as by allocating the OFDM carrier data bit vectors to the corresponding symbol resources.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An electronic device configured for operation in a higher-tier network, the electronic device comprising one or more processors configured to:
  receive a statistical distribution of the geographic locations of transmitters of a lower-tier network and a number of transmitters of the lower-tier network;

determine, based on the statistical distribution and the number of transmitters, a probability density function of aggregate interference to the higher-tier network from one or more transmitters of the lower-tier network;

determine a cumulative density function of the aggregate interference based on the probability density function; and determine, based on the cumulative distribution function, a probability that the aggregate interference is less than an interference threshold;

determine a geographic zone for limited transmission by transmitters of the lower-tier network based on the probability; and indicate the geographic zone to the lower-tier network.

2. The electronic device of claim 1, wherein the one or more processors are configured to determine the probability density function of the aggregate interference by:

estimating interference to the higher-tier network from a single transmitter of the lower-tier network based on the statistical distribution to obtain a probability density function of interference from a single transmitter of the lower-tier network to the higher-tier network; and determining, based on the probability density function of the interference from the single transmitter, the probability density function of the aggregate interference.

3. The electronic device of claim 1, wherein the statistical distribution does not identify specific locations of transmitters of the lower-tier network.

4. The electronic device of claim 1, wherein the higher-tier network is a Spectrum Access System (SAS) Priority Access License (PAL) network, and the lower-tier network is a SAS General Authorized Access (GAA) network.

5. The electronic device of claim 1, wherein the higher-tier network is a Spectrum Access System (SAS) incumbent network, and the lower-tier network is a SAS Priority Access License (PAL) network or a SAS General Authorized Access (GAA) network.

6. The electronic device of claim 1, wherein higher-tier network and the lower-tier network share spectrum with an incumbent network as part of a shared spectrum network.

7. A method of operating a shared spectrum network device in a higher-tier network, the method comprising:

receiving a statistical distribution of the geographic locations of transmitters of a lower-tier network and a number of transmitters of the lower-tier network;

estimating an aggregate interference to the higher-tier network from the lower-tier network by:

determining, based on the statistical distribution and the number of transmitters, a distance probability density function of the distance between a single transmitter of the lower-tier network and a transmitter of the higher-tier network, and determining, based on the distance probability density function, an aggregate interference density function of the aggregate interference from multiple transmitters of the lower-tier network to the transmitter of the higher-tier network;

determining a geographic zone for limited transmission by one or more transmitters of the lower-tier network based on the aggregate interference density function; and indicating the geographic zone to the lower-tier network.

8. The method of claim 7, wherein the higher-tier network is a Spectrum Access System (SAS) incumbent network, and the lower-tier network is a SAS Priority Access License (PAL) network or a SAS General Authorized Access (GAA) network.

9. The method of claim 7, wherein the higher-tier network and the lower-tier network share spectrum with an incumbent network as part of a shared spectrum network.

10. The method of claim 7, wherein determining the geographic zone for limited transmission by one or more transmitters of the lower-tier network based on the aggregate interference comprises:

determining the geographic zone based on whether the aggregate interference density function indicates that the aggregate interference exceeds an interference threshold.

11. The method of claim 7, wherein determining the geographic zone for limited transmission comprises:

determining, based on the aggregate interference density function, whether the aggregate interference from the lower-tier network is below an interference threshold; and determining the geographic zone for limited transmission based on whether the aggregate interference from the lower-tier network is below an interference threshold.

12. The method of claim 7, wherein the aggregate interference density function is a cumulative distribution function of the probabilities of the aggregate interference being less than various interference levels.

13. The method of claim 7, wherein determining the aggregate interference density function comprises:

determining an aggregate interference probability density function of the probability that the aggregate interference is various levels; and integrating the aggregate interference probability density function to obtain the aggregate interference density function.

14. An electronic device configured for operation in a higher-tier network, the electronic device comprising one or more processors configured to:

receive a statistical distribution of the geographic locations of transmitters of a lower-tier network and a number of transmitters of the lower-tier network;

estimate an aggregate interference to the higher-tier network from the lower-tier network by:

determining, based on the statistical distribution and the number of transmitters, a distance probability density function of the distance between a single transmitter of the lower-tier network and a transmitter of the higher-tier network, and determining, based on the distance probability density function, an aggregate interference density function of the aggregate interference from multiple transmitters of the lower-tier network to the transmitter of the higher-tier network;

determine a geographic zone for limited transmission by one or more transmitters of the lower-tier network based on the aggregate interference density function; and indicate the geographic zone to the lower-tier network.

15. The electronic device of claim 14, wherein the one or more processors are configured to determine the geographic zone for limited transmission by:

determining, based on the aggregate interference density function, the probability that the aggregate interference from the lower-tier network is below an interference threshold; and determining the geographic zone for limited transmission based on the probability that the aggregate interference from the lower-tier network is below the interference threshold.

16. The electronic device of claim 14, wherein the aggregate interference density function is a cumulative distribution function of the probabilities of the aggregate interference being less than various interference levels.

17. The electronic device of claim 14, wherein the one or more processors are configured to determine the aggregate interference density function by:
   determining an aggregate interference probability density function of the probability that the aggregate interference is various levels; and
   integrating the aggregate interference probability density function to obtain the aggregate interference density function.

* * * * *